(12) United States Patent
Burd et al.

(10) Patent No.: US 11,097,845 B2
(45) Date of Patent: Aug. 24, 2021

(54) SYSTEM AND APPARATUS FOR AIR FLOW HANDLING IN AN AIRCRAFT MONUMENT

(71) Applicant: B/E Aerospace, Inc., Winston-Salem, NC (US)

(72) Inventors: Peter John Leslie Burd, Carmarthenshire (GB); Neil R. Elshaw, Gosport (GB); Sam Foster, Milton Keynes (GB); Venkata Prasanth Suman Neti, Buckinghamshire (GB); Merv Davidson, Wellington, FL (US); Elizabeth M. Payne, Rowesham (GB); Christopher Ray, Ampthill (GB); Danyal Siddiqui, Greater London (GB); Boryan Kashikov, Leighton Buzzard (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 807 days.

(21) Appl. No.: 15/647,711

(22) Filed: Jul. 12, 2017

(65) Prior Publication Data

US 2018/0016018 A1 Jan. 18, 2018

Related U.S. Application Data

(63) Continuation-in-part of application No. 15/647,132, filed on Jul. 11, 2017, now abandoned.

(Continued)

(51) Int. Cl.
*B64D 13/06* (2006.01)
*B64D 11/04* (2006.01)
(Continued)

(52) U.S. Cl.
CPC .............. *B64D 11/04* (2013.01); *B21D 53/92* (2013.01); *B64D 9/003* (2013.01); *B64D 13/06* (2013.01);
(Continued)

(58) Field of Classification Search
CPC .................... B64D 9/003; B64D 11/04; B64D 2013/0629; B64D 13/06; F25B 2500/12; F16B 5/0088; F16B 5/0225
(Continued)

(56) References Cited

U.S. PATENT DOCUMENTS 3,171,401 A * 3/1965 McDuffee ................. F24F 6/04
126/113
4,106,587 A 8/1978 Nash et al.
(Continued)

FOREIGN PATENT DOCUMENTS

JP H05322379 A 12/1993

OTHER PUBLICATIONS

Harris (ed.), Noise Control Manual, 1991, Springer Science + Business Media, pp. 45-52. (Year: 1991).*

*Primary Examiner* — Kenneth J Hansen
*Assistant Examiner* — Phillip Decker
(74) *Attorney, Agent, or Firm* — Suiter Swantz pc llo

(57) ABSTRACT

In an illustrative embodiment, an aircraft galley ducting assembly provides airflow to at least one compartment of an aircraft galley monument. The ducting assembly may include a supply air duct that provides a supply airflow path to a compartment that includes an inlet port mounted to a compartment surface. A return air duct may provide an exit airflow path for return air that has circulated throughout the compartment and includes an outlet port mounted to the compartment surface. An airflow adjustment apparatus with an airflow adjustment surface is positioned within the supply airflow path of the supply air duct or the exit airflow path of the return air duct to cause a modification of airflow properties for air passing across or through the airflow adjustment surface.

10 Claims, 21 Drawing Sheets

Related U.S. Application Data

(60) Provisional application No. 62/361,460, filed on Jul. 12, 2016.

(51) Int. Cl.
*F16B 5/02* (2006.01)
*F16B 5/00* (2006.01)
*B64D 9/00* (2006.01)
*B21D 53/92* (2006.01)
*B64F 5/00* (2017.01)

(52) U.S. Cl.
CPC .............. *B64F 5/00* (2013.01); *F16B 5/0088* (2013.01); *F16B 5/0225* (2013.01); *B64D 2013/0629* (2013.01); *F25B 2500/12* (2013.01); *Y10T 403/75* (2015.01)

(58) Field of Classification Search
USPC .......................................................... 454/76
See application file for complete search history.

(56) References Cited

U.S. PATENT DOCUMENTS

| | | | |
|---|---|---|---|
| 4,989,252 A | 1/1991 | Nakanishi et al. | |
| 5,947,082 A | 9/1999 | Choi et al. | |
| 6,148,631 A | 11/2000 | Watanabe et al. | |
| 6,168,518 B1 | 1/2001 | Messmer et al. | |
| 6,196,187 B1* | 3/2001 | Zubeck | F02M 35/1216 123/339.1 |
| 6,609,590 B2* | 8/2003 | Zelinski | F01N 1/083 181/264 |
| 6,632,269 B1 | 10/2003 | Najm | |
| 6,827,180 B2 | 12/2004 | Wilson | |
| 7,201,254 B2 | 4/2007 | Redmann et al. | |
| 7,231,778 B2 | 6/2007 | Rigney et al. | |
| 7,631,726 B2 | 12/2009 | McWilliam et al. | |
| 7,694,660 B2 | 4/2010 | Koss | |
| 7,942,234 B2 | 5/2011 | Utsunomiya | |
| 8,033,783 B2 | 10/2011 | Ishikawa et al. | |
| 9,624,662 B1 | 4/2017 | Hall et al. | |
| 9,802,703 B2* | 10/2017 | Moran | B64D 11/0007 |
| 9,957,050 B2* | 5/2018 | Moran | B64D 13/00 |
| 9,987,902 B2 | 6/2018 | Burd | |
| 10,077,707 B2 | 9/2018 | Roy et al. | |
| 2010/0175410 A1 | 7/2010 | Lee et al. | |
| 2013/0047657 A1* | 2/2013 | Oswald | B64D 11/04 62/407 |
| 2014/0014436 A1 | 1/2014 | Nguyen et al. | |
| 2014/0044913 A1 | 2/2014 | Burd | |
| 2015/0059385 A1* | 3/2015 | Burd | B60H 1/00014 62/239 |
| 2015/0099446 A1* | 4/2015 | Burd | B64D 13/08 454/152 |
| 2015/0211670 A1 | 7/2015 | Edmonds et al. | |
| 2016/0027427 A1 | 1/2016 | Vang et al. | |
| 2016/0046380 A1 | 2/2016 | Ng et al. | |
| 2016/0325570 A1 | 11/2016 | Oppenheimer et al. | |
| 2018/0016012 A1* | 1/2018 | Burd | F25D 17/045 |

* cited by examiner

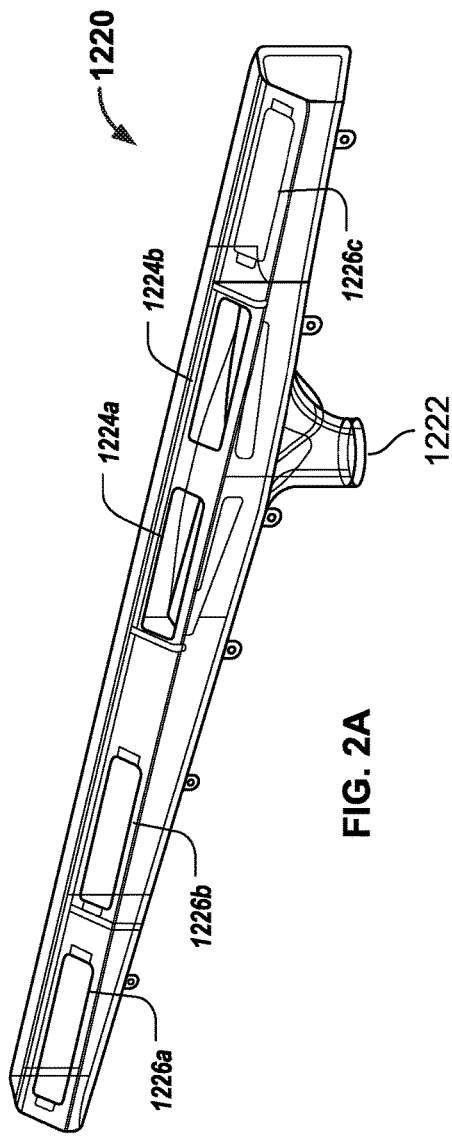
FIG. 2A
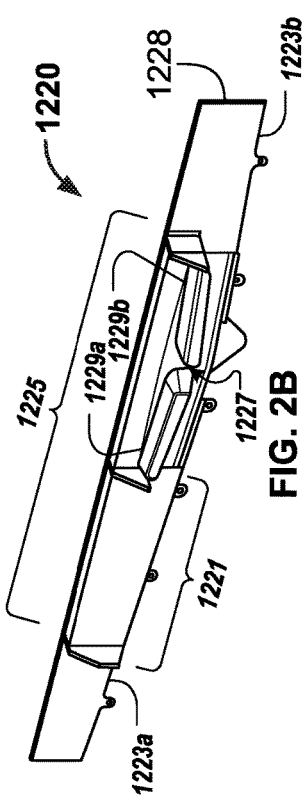
FIG. 2B
FIG. 2C
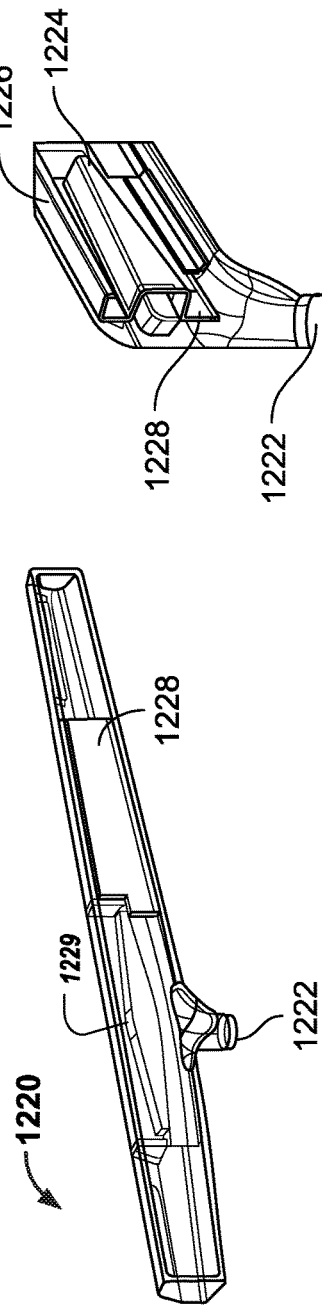
FIG. 2D

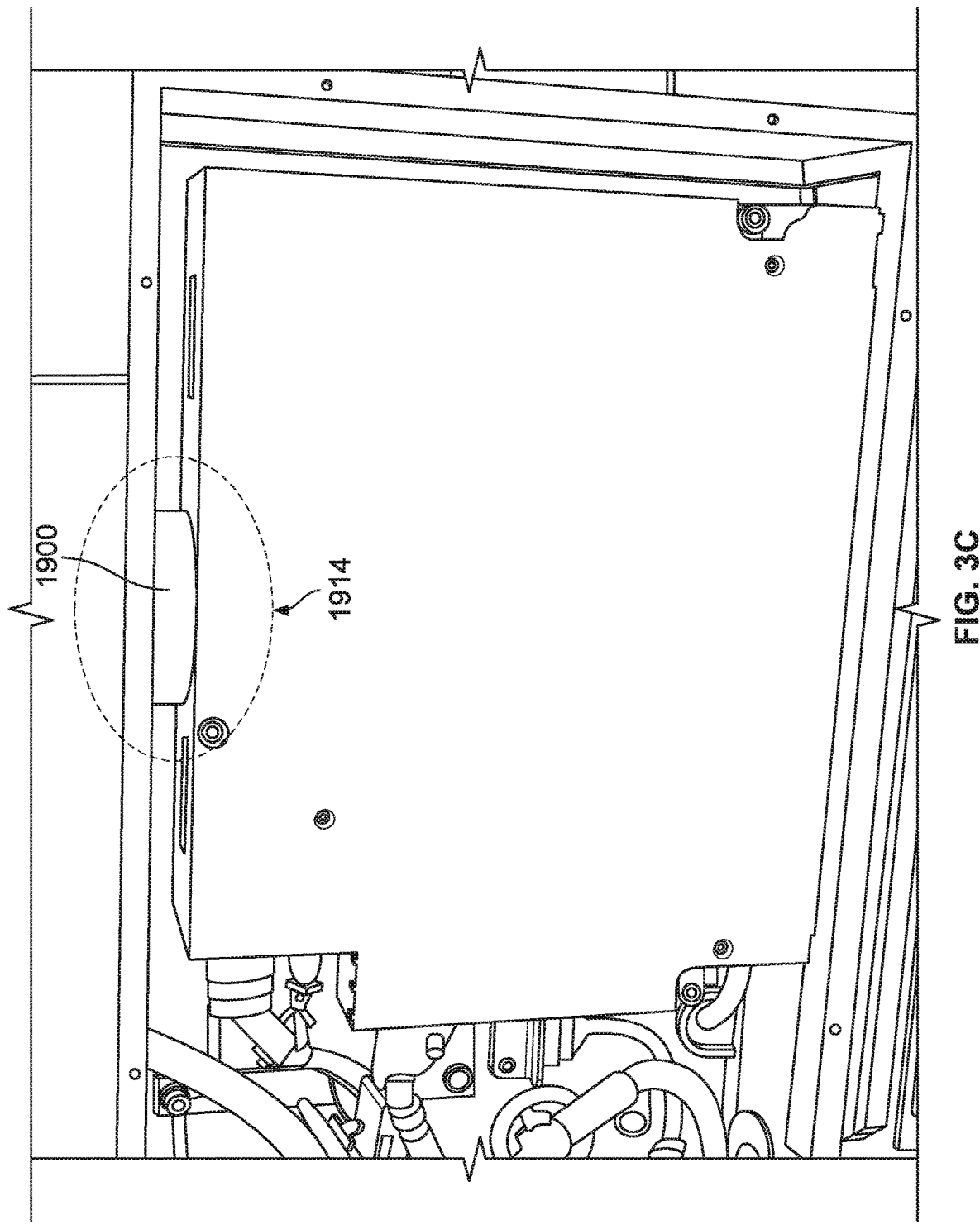

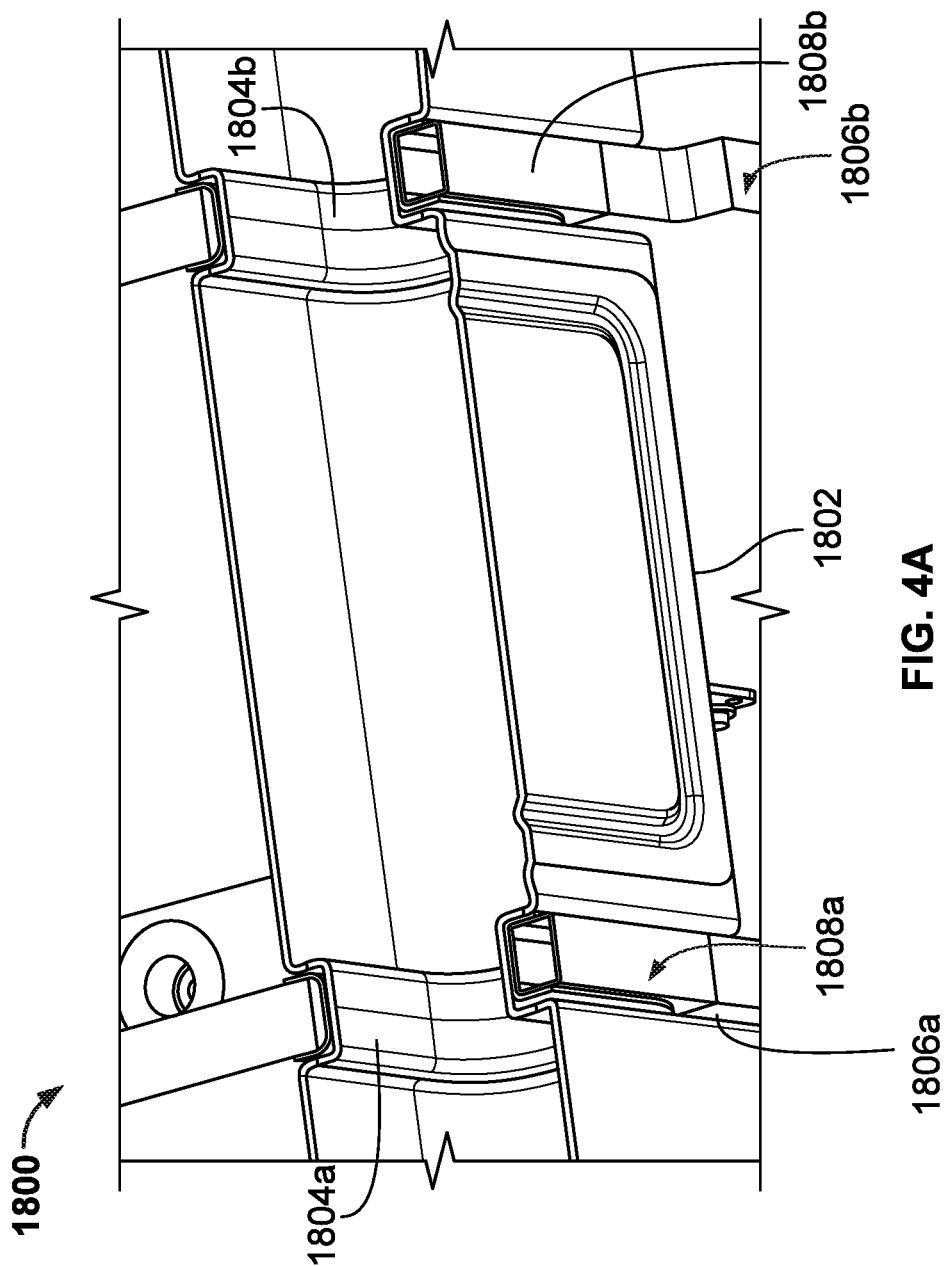

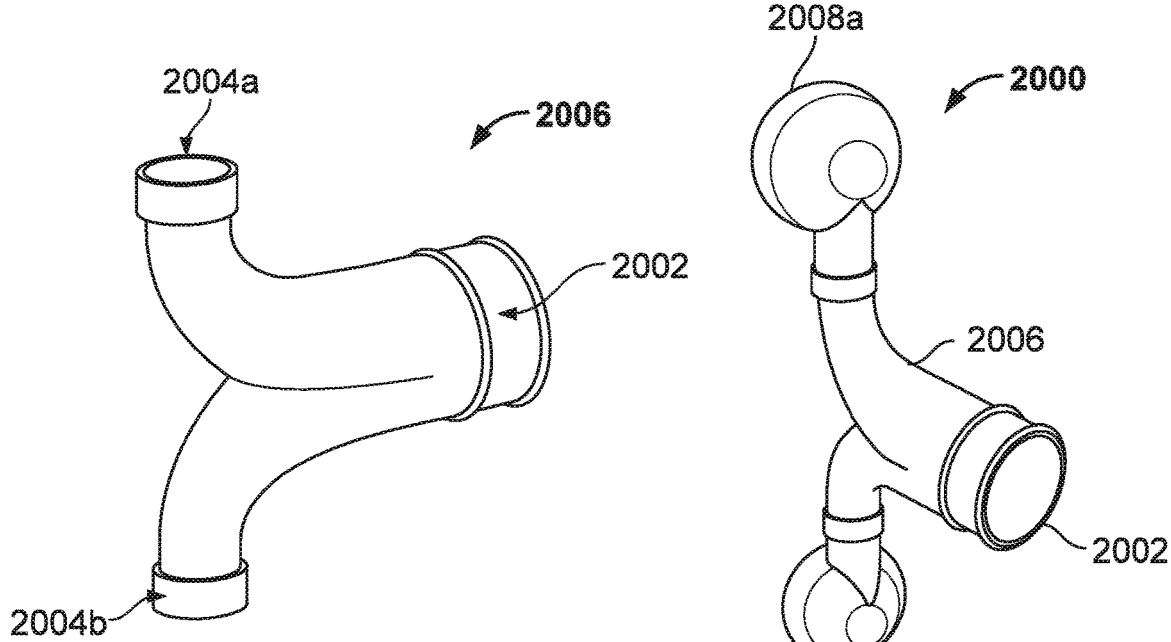
FIG. 10A
FIG. 10B
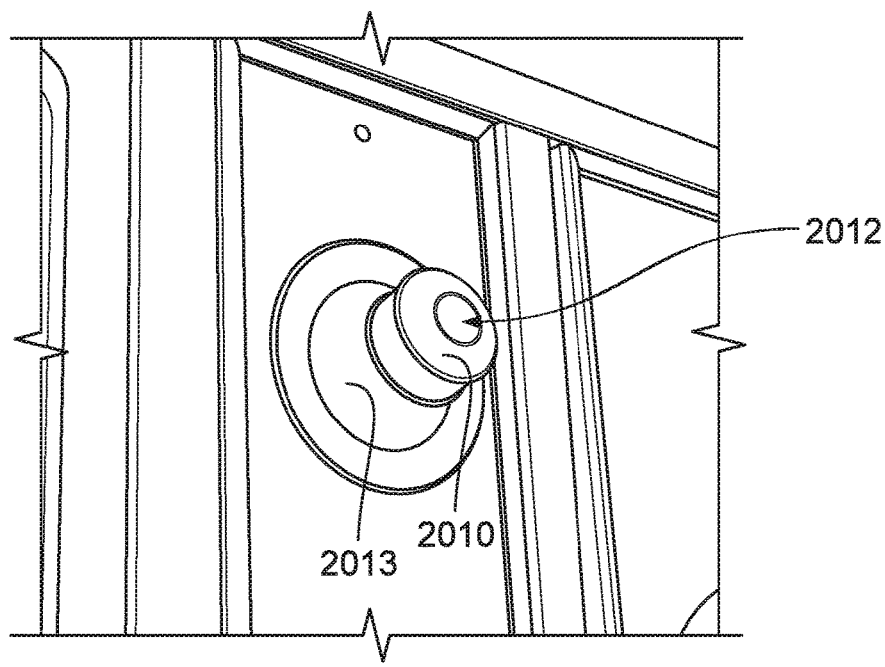
FIG. 10C

SYSTEM AND APPARATUS FOR AIR FLOW HANDLING IN AN AIRCRAFT MONUMENT

CROSS-REFERENCE TO RELATED APPLICATIONS

This application is a continuation-in-part of U.S. application Ser. No. 15/647,132, filed Jul. 11, 2017 and claims priority to U.S. Provisional Patent Application Ser. No. 62/361,460, entitled "Aircraft Galley Monument Systems, Apparatus and Methods for Use Thereof," filed Jul. 12, 2016. This application incorporates by reference, in its entirety, the following prior patent application directed to ducting for aircraft galleys: U.S. patent application Ser. No. 14/467,583, entitled "Universal Modular Ducting for Chilled Aircraft Galleys," filed Aug. 25, 2014. This application also incorporates by reference, in its entirety, the following prior patent application direct to noise reduction in galley air systems: U.S. patent application Ser. No. 13/940,012, entitled "Noise-Reducing Air Inlet Grille for an Appliance," filed Jul. 11, 2013. All above identified applications are hereby incorporated by reference in their entireties.

BACKGROUND

The present disclosure relates to air flow management systems for commercial aircraft. In-flight catering services typically incorporate self-contained refrigeration units that are cooled to prevent spoilage of food prior to distribution to passengers, and to keep beverages at desired serving temperatures, as well as separate ovens for heating food in the preparation of hot meals to be served aboard aircraft. Currently space must be allocated for each of the heating and cooling devices separately, either in the same galley or in different galleys as well as for the pathways for routing and directing air flow into and out of galley monuments equipped with catering services that require temperature control.

A modular aircraft galley monument may utilize a variety of air flow elements for providing heating and cooling requirements into and out of the galley monument. As the air flow elements often involve circulation of air at a variety of temperatures, a number of components may be used to affect such circulation. Components can include ductwork, seals, plenums, filters, restrictors, and various proportioning devices for adjusting or directing air flow.

An aircraft galley monument may include a chilled air distribution system for cooling and maintaining the perishable contents of trolleys and other service units. When attempting to evenly cool multiple cart bays, systems often use a continuous box duct that feeds individual cart locations. However, this layout creates difficulties in balancing airflow volumes and pressure drops at individual air supply outlets, which may severely limit the efficiency of the cooling system. The severity of the difficulties increases relative to the number of compartments needed to be chilled.

SUMMARY OF ILLUSTRATIVE EMBODIMENTS

The forgoing general description of the illustrative implementations and the following detailed description thereof are merely exemplary aspects of the teachings of this disclosure, and are not restrictive.

In certain embodiments, an aircraft galley ducting assembly may provide airflow to at least one aircraft galley compartment. The ducting assembly may include a supply air duct that provides a supply airflow path from an external air system to an aircraft galley compartment that includes an inlet port mounted to a galley compartment surface to provide an inlet path for air flowing into the galley compartment. A return air duct may provide an exit airflow path to the external air system for return air that has circulated throughout the galley compartment and includes an outlet port mounted to the galley compartment surface to provide an outlet path for the return air to the return air duct. In another embodiment, the galley work duct may recirculate air from an outlet to an inlet in a galley compartment via a cooling device mounted within or on the galley. An airflow adjustment apparatus with an airflow adjustment surface may be positioned within the supply airflow path of the supply air duct or the exit airflow path of the return air duct to cause a modification of airflow properties for air passing across or through the airflow adjustment surface.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIGS. 2A-2E illustrate various views of example air distribution duct housings for use with various galley monument designs described herein including connections to an air handling system;

FIGS. 3A-3C illustrate various views of a sealing collar for sealing air flow between an ACU outlet and a duct inlet of a galley monument;

FIGS. 4A-4C illustrate various views of a galley extraction system;

FIGS. 10A-10C illustrate various views of a gasper assembly;

DETAILED DESCRIPTION OF ILLUSTRATIVE EMBODIMENTS

Figure 1A:
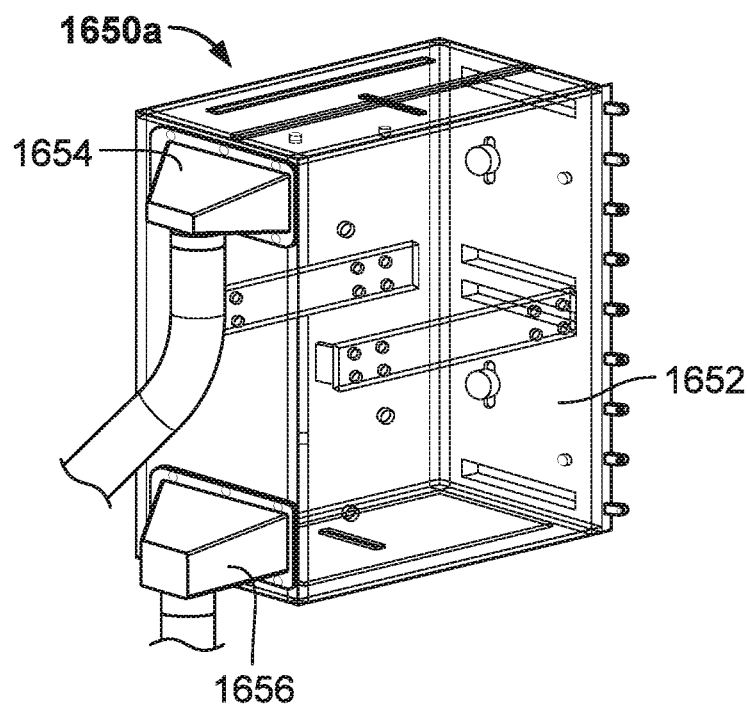
FIGS. 1A-1B illustrate perspective views of a galley compartment with connections to an air cooling unit (ACU)

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Aspects of the present disclosure may be directed to air system connections to galley monuments that may interface with various types of aircraft air handling systems based on a functionality of the galley monument. For example, heated air systems, air conditioning systems, and air extraction systems may connect to various compartments for the storage of food, beverages, equipment, and other items needed for servicing passengers and flight operations. In one example, the galley monument may include at least one of a trolley bay and a chilled trolley bay that may be configured to house multiple sizes and types of trolleys and may be positioned beneath a work surface of the galley monument.

In some implementations, the galley monument may include at least one air duct associated with each of the external aircraft air handling systems that may provide an intake and/or an exhaust path for air entering and/or leaving the compartments of the galley monument, such as the trolley bays. For example, the supply and exhaust air flows may be separated into different streams within each individual air duct.

Figure 14:
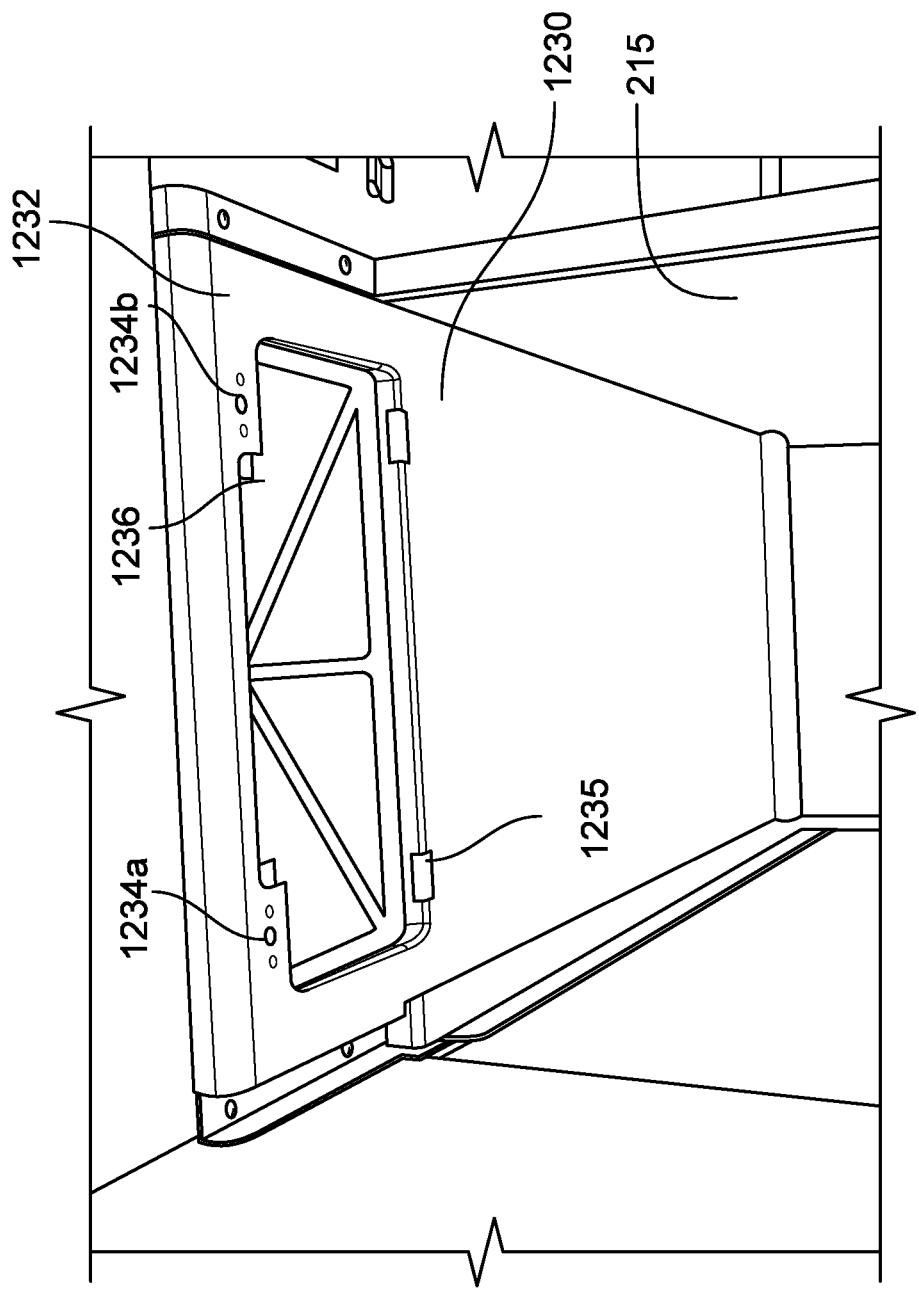
FIG. 14 illustrates a plenum for mounting above a compartment of various galley monument designs described herein including connections to an air handling system.

In some implementations of galley monuments, air flow may be an important consideration whether for supplying air into or extracting air out of a galley monument. Air flow into the galley monument may be provided for purposes of heating or cooling a compartment or appliance of the monument, for example, a chilled trolley bay, an oven, refrigerator, or beverage maker. Air from a source, such as an Air Cooling Unit (ACU) or heater may be directed into the galley monument by various ducts, pipes, hoses, and vents, such as those shown in FIGS. 1A-1B. In some examples, air flow extraction or evacuation from the galley monument may be provided for purposes such as reducing temperature, steam, or odors, as illustrated by FIG. 14. In some examples, it may be advantageous for each of the connections within an air flow distribution system to be tightly sealed to a mounting surface or component to allow for maximum cooling and/or heating efficiency. To that end, seals such as those illustrated by FIGS. 3A-3C may be beneficial to include where applicable, such as at joints connecting an air supply source to a duct, pipe, or hose, or a first duct, pipe, or hose connecting a second duct, pipe, hose, or other air flow control device. Air flow control devices may be adjustable or non-adjustable. Non-adjustable examples may include devices with fixed shapes designed to change pressure or air flow rates, or alter other air flow characteristics such as inducing or reducing turbulence, between an inlet point and an outlet point, such as a pressure reducing cone 2256 that reduces air pressure as air flows over the cone 2256 but also increases velocity and an airbox 2406, illustrated by FIGS. 6 and 7, respectively.

Further, air flow adjustment devices may be connected to various ducts, pipes, hoses, and vents within the galley monument. In some examples, air flow adjustment devices may be intended to be adjustable while an aircraft is in-use (e.g., during a flight), which may include gasper assembly 2000 (illustrated in FIGS. 10A-10C). Other air flow adjustment devices may be tuned, adjusted, cleaned, or replaced with components that produce desired air flow characteristics primarily during aircraft maintenance or preparation for flight service (e.g., while the aircraft is grounded and may be connected to ground power and other ground services) such as restrictors 1280*a*, 1280*b* (FIGS. 8A-8C), a restrictor 2100 (FIGS. 9A-9C), an air deflection system 1850 (FIGS. 11A-11B), and an air flow adjuster 2200 including a splitter 2208 (illustrated by FIG. 12).

Figure 13:
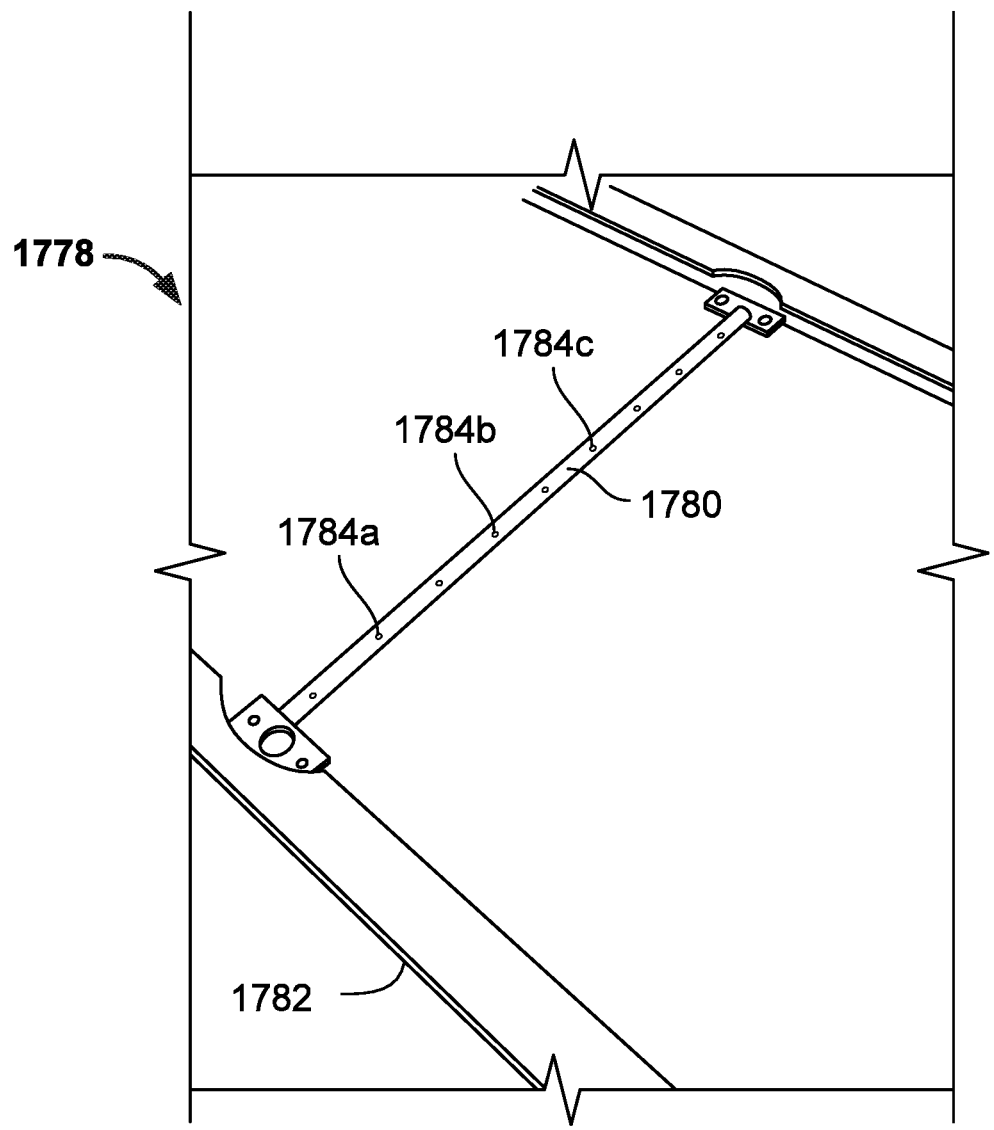
FIG. 13 illustrates a pressure measurement system for monitoring air flow within an air duct of a galley monument system.

In some implementations, air flow characteristics can be measured using a variety of devices, such as, for instance, a pressure measurement system 1778 shown in FIG. 13 to determine air pressure within a duct, plenum, housing, or other air flow system. Measuring air flow characteristics may be helpful in determining whether air flow adjustments, such as those made using air flow adjustment devices, may produce intended or expected results in each part of an air flow system, particularly in situations where modifications to a galley monument configuration have been made.

Figure 1B:
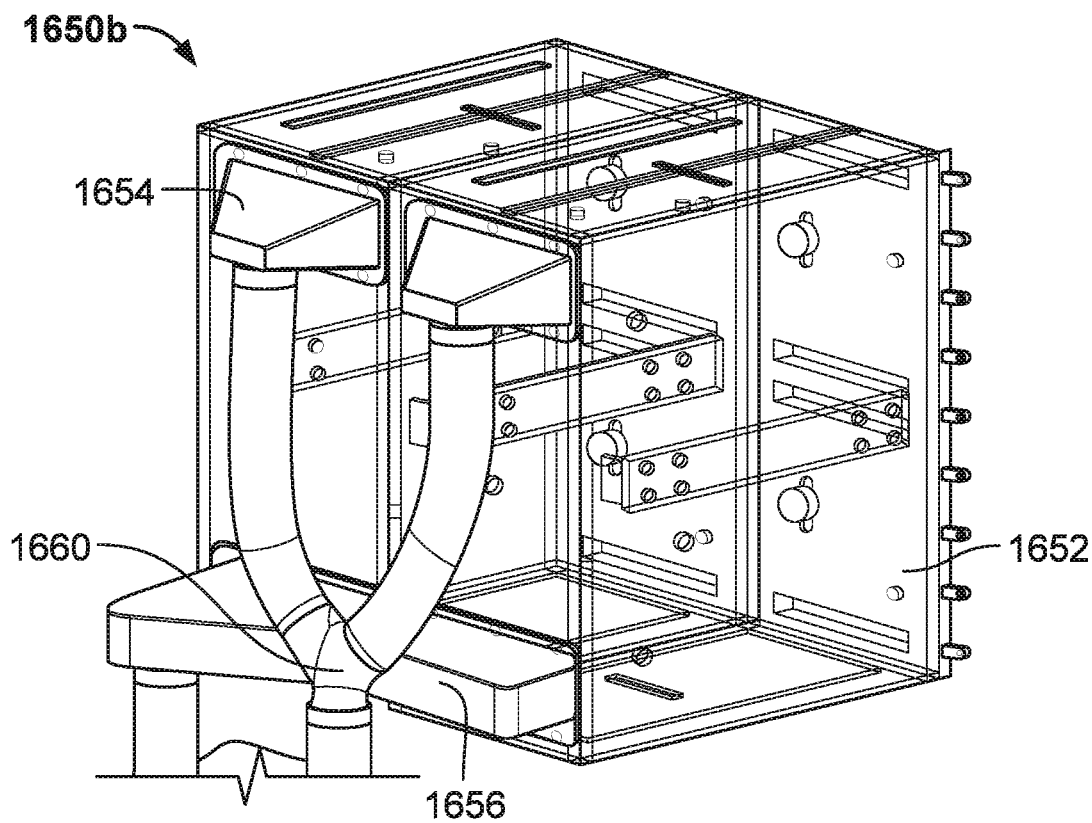
Figure 2E:
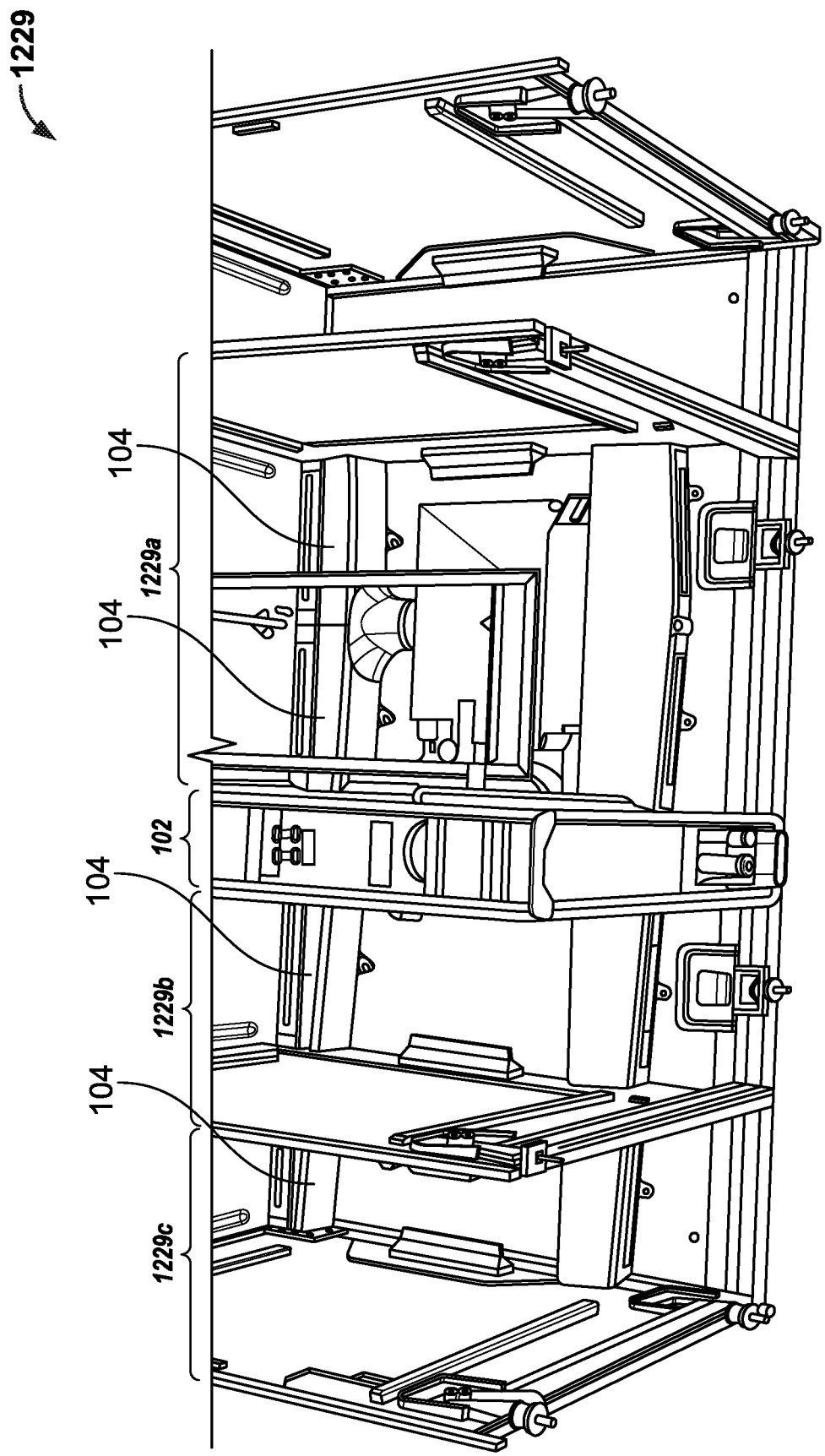

Turning to FIGS. 1A-1B, perspective views of a chilled galley compartment 1650 with connections to an ACU for supplying chilled air to the chilled galley compartment 1650 are illustrated. In some implementations, the chilled compartment 1650 may be a chilled trolley bay configured to house one or more chilled trolleys. In some implementations, the chilled compartment 1650 may include an insulated door 1652, a cold air inlet 1654, and a return air duct 1656. Other examples of chilled trolley compartments include trolley compartments 1229 (FIG. 2E).

The cold air inlet 1654 and the return air duct 1656 may each be mounted at a first end to a rear side of the chilled galley compartment 1650 to provide flow paths for chilled air and return air into and out of the chilled galley compartment 1650. In some examples, the cold air inlet 1654 and the return air duct 1656 may each be connected at a second end to an ACU (not shown) provides cold air flow from the ACU to the chilled compartment 1650 through the cold air inlet 1654, and evacuates warmer return air out of the chilled galley compartment 1650 by drawing the return air out through the return air duct 1656. In some implementations, the cold air inlet 1654 may be positioned at an upper end of the rear surface of the chilled galley compartment 1650 such that cold air flows into an upper portion of the chilled galley compartment 1650 while the return air duct 1656 may be positioned such that return air flows out from a lower portion of the chilled galley compartment 1650.

The insulated door 1652 may be hingedly connected to an opening at a front end of the chilled galley compartment 1650 to allow access to the interior of the chilled galley compartment 1650 while the insulated door 1652 is in a first, open position. In a second, closed position, the insulated door 1652 may seal the interior of the chilled galley compartment 1650 to maintain control over temperature within the compartment 1650. In some implementations, the chilled galley compartment 1650 may provide the functionality of a refrigerator.

In one example, the cold air inlet 1654 may be connected at the second end to a Y-splitter 1660 in a case where the ACU supplies cold air to more than one cold air inlet 1654, for example, such as when there is more than one chilled compartment 1650, or when a chilled compartment 1650b includes more than one cold air inlet 1654. The Y-splitter 1660 is then connected to the ACU.

Rather than feeding all of the chilled air produced by an ACU into a homogeneous box duct as in conventional air flow systems, the air flow system of the present disclosure may include a bifurcated distribution duct to improve flow distribution characteristics across each of the compartments within the galley monument that receive air flow from the ACU.

Turning to FIGS. 2A-2E, an air distribution duct housing 1220 for use with various galley monument designs described herein may include connections to an air handling system. In some implementations, the air distribution duct housing 1220 may bifurcate entering air flow vertically and/or horizontally such that the air flow exiting each outlet of the air distribution duct housing 1220 can be tuned to be substantially proportional (e.g., approximately equal) in pressure and volume from a nearest chilled air supply outlet to a furthest air supply outlet from the chilled air source. Attaining a substantially proportional distribution of air pressure and volume across the air supply outlets may be accomplished through a tuning of chambers within the duct housing 1220 using repositionable dividers or vanes to produce a Venturi effect. In one example, the output air flow of the duct housing 1220 is used to chill at least three trolley bays in an aircraft galley monument, such as a chilled trolley bay. In other designs, similar duct housings can be used to chill from two galley compartments to eight or more galley compartments based on balancing specifications for the compartments. In one example, air provided from the duct housings to the galley compartments may be balanced within 5% of one another. However, the air flow provided to galley compartments may also be unbalanced to meet prevailing heat loads of a chilled compartment configuration. For example, outermost compartments of a galley monument may have higher heat loads than inner (middle) compartments such that more air flow may be provided to the outer compartments to compensate for losses. The distribution duct 1220 may be formed from fire approved Phenolic glass, carbon reinforced Epoxy or Phenolic composite laminate, or vacuum formed plastic. The selection of materials for the distribution duct 1220 may be based on tradeoffs between weight of the materials and cost. For example, vacuum form may have a lowest cost but have a heaviest weight while carbon may have a highest cost but a lightest weight. In some examples, the distribution duct 1220 may be made of glass fiber, which provides a balance between cost and weight.

As illustrated in FIG. 2A, the air distribution duct housing 1220 may include an inlet port 1222, one or more inner exit ports 1224 (illustrated as two inner exit ports 1224a-1224b), and one or more outer exit ports 1226 (illustrated as three outer exit ports 1226a-1226c). In some implementations, the inlet port 1222 may be connected at a first end to an ACU (not shown) and at a second end may be mounted to an interior surface of the aircraft galley monument, as illustrated in relation to air distribution duct housing 104 of FIG. 2E. As shown in an upward facing view of FIG. 2E from below looking toward the top of an aircraft galley 1229, the air distribution duct housing 104 may be installed along four separate galley compartments 1229a through 1229c, where compartment 1229a may be a double width compartment. In some examples, each duct housing 104 for the separate compartments 1229a through 1229c may be sealed off from one another in order to control individual compartment air volumes to suit the heat load and compartment layout. For this reason, additional air may be directed to the galley compartment 1229a than to compartments 1229b and 1229c when tuning the proportionate flow of air to the air distribution duct housing 104 for each of the galley compartments 1220a-1229c. Additionally, the galley compartment 1229a may be separated from adjacent galley compartment 1229b by an electricity and fluid conduit region 102. In some examples, the duct housing 104 passes through the conduit region 102 as a sealed and insulated duct, and the conduit region 102 may be open to ambient air. As illustrated in FIG. 2A, for example, the outlets 1224a and 1226b are separated by a wider gap than the separation of the other proximate outlets of the air distribution duct housing 1220, a design option which may be provided to block air from flowing against the conduit region 102.

In some implementations, the connection of the air distribution duct housing 1220 to the ACU at the inlet port 1222 may allow the air to flow through the inlet port 1222 into the air distribution duct housing 1220. The ACU may be positioned proximate the air distribution duct housing 1220 or connected remotely by a main air duct feed. The ACU, for example, may be positioned horizontally above or below the installation point of the air distribution duct housing 1220.

Turning to FIG. 2C, a vertical divider 1228 may be provided for distributing conditioned air flow, for example, between two chilled trolley compartments. Specifically, air may flow into at least one inner exit port 1224 and at least one outer exit port 1226 positioned along a substantially horizontal axis within the air distribution duct housing 1220. The vertical divider 1228 may separate the at least one inner exit port 1224 from the at least one outer exit port 1226 to isolate air flows, allowing smoother, more efficient air flows through the at least one inner exit port 1224 and the at least one outer exit port 1226. In some examples, exit port 1226 may be directed upward to provide air to compartments above a work deck, and the chiller itself may be located within trolley bays below work deck (BWD) and may be connected to inlet port 1222, and the exit port 1224 may provide air flow to the BWD trolley bays. Depending on the application, the vertical divider 1228 may be designed and positioned to divide the air flows between the at least one inner exit port 1224 and the at least one outer exit port 1226 evenly or by some other unequal proportion such that the volume of air flow directed to the at least one inner exit port 1224 may be greater than or less than the volume of air flow directed to the at least one outer exit port 1226. In some examples, the duct housing 1220 may be modularly constructed to more easily manufacture duct housings 1220 for galley monuments having different compartment configurations.

To create multiple inner exit ports 1224 and multiple outer exit ports 1226, in some embodiments, the air distribution duct housing may include at least one horizontal divider 1229. The horizontal dividers 1229, for example, may further bifurcate the air flow and contribute to the Venturi effect. For example, an aperture region 1227 may create a Venturi as air flow passing through aperture region 1227 is restricted, which may increase a velocity of the air flow and make the air flow more laminar and directionally stable. To bifurcate a region close to the inlet 1222 without including the outer exit ports 1226, in other embodiments, an air distribution duct housing may include only horizontal inserts.

As illustrated in FIG. 2B, the horizontal divider(s) 1229 and vertical divider(s) 1228 may produce two primary airflow chambers 1223 and 1225, as well as a subdivision chamber 1221 of chamber 1225. Airflow within the subchamber 1221 is controlled by the vertical divider(s) 1228, and a position of the vertical divider 1228 may be tuned during design and manufacturing based on computational fluid dynamics (CFD) models. Subdivision chamber 1221 may be used, for example, to chill regions of an equal size or larger compartment, for example the compartment 1229a of FIG. 2E. In some examples, the subdivision chamber 1221 may be used to supply above work deck (AWD) compartments with both the supply air flow and a separate extracted exhaust.

Figure 3A:
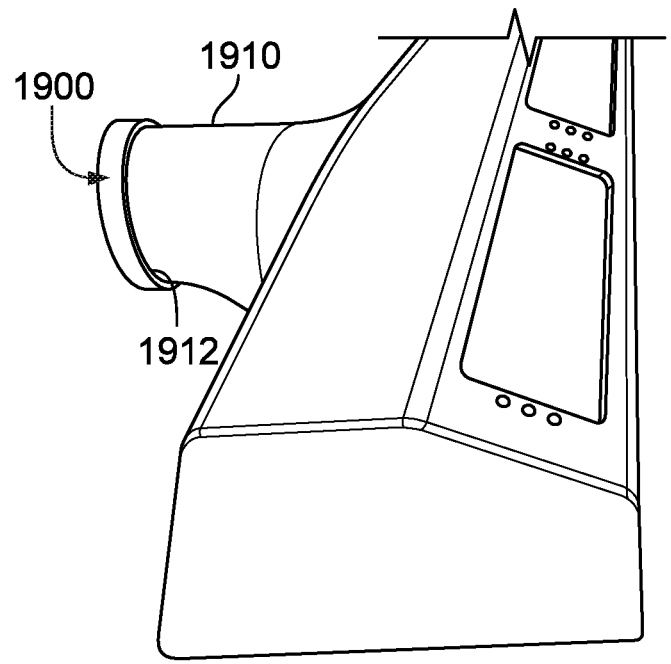
Figure 3B:
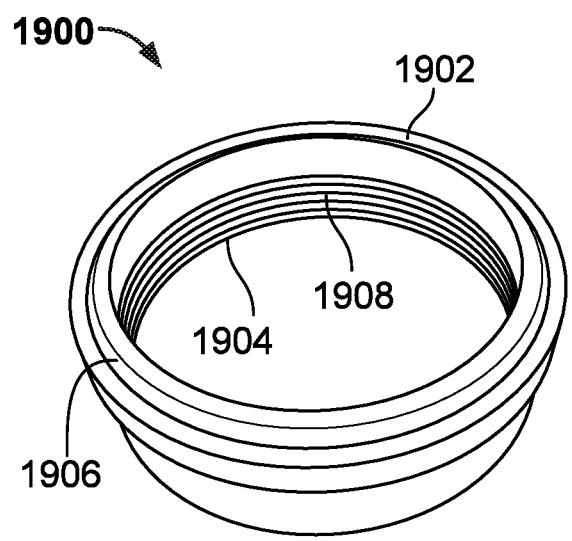

FIGS. 3A-3C illustrate various views of a sealing collar 1900 for sealing air flow between an ACU outlet and a duct inlet of a galley monument, according to an example embodiment, such as a sealing collar for the inlet port 1222 of the distribution duct housing 1220 (FIGS. 2A-2E). In some implementations, a first end of the sealing collar 1900 may have a first inner diameter 1902 and a second end of the sealing collar 1900 may have a second inner diameter 1904. In some examples, the sealing collar 1900 may have a tapered shape such that the first inner diameter 1902 is greater than the second inner diameter 1904. In some examples, the sealing collar 1900 may include threads 1908 disposed on an inner surface of the second inner diameter 1904 to allow the sealing collar 1900 to screw onto a threaded ring, for example, a threaded ring 1912 bonded to a duct inlet 1910. In some implementations, the sealing collar 1900 may be positioned between a duct inlet 1910 and an ACU outlet 1914 (FIG. 3C). In one example, an angled edge 1906 may surround an exterior surface of the sealing collar 1900 to allow the sealing collar 1900 to fit over a similarly sized ACU outlet 1914, and for the sealing collar 1900 to be axially adjusted through rotation about the threaded ring 1912, to form a self-centering, airtight seal with the ACU outlet 1914 around a portion of the angled edge 1906 that is the same diameter as the ACU outlet 1914. Air flow may then be efficiently channeled from the ACU outlet 1914 into the duct inlet 1910 through the sealing collar 1900. In another example, the arrangement of the sealing collar 1900 may be reversed such that the ACU outlet 1914 includes threads 1908 and the duct inlet 1910 connects with the angled edge 1906 of the sealing collar 1900. In another example, the sealing collar 1900 may connect the ACU outlet 1914 to the inlet port 1222 of the air distribution duct housing 1220 illustrated by FIGS. 2A-2E.

In some implementations, modular ducts and assemblies may be connected to galley monuments to provide for the extraction of air away from galley monuments. The assemblies may have compact or space saving designs intended to connect to monument walls. The assemblies may possess various shapes, lengths, and cross sections to accommodate space limitations, to seal connections between components, and to meet other functional requirements.

Figure 4B:
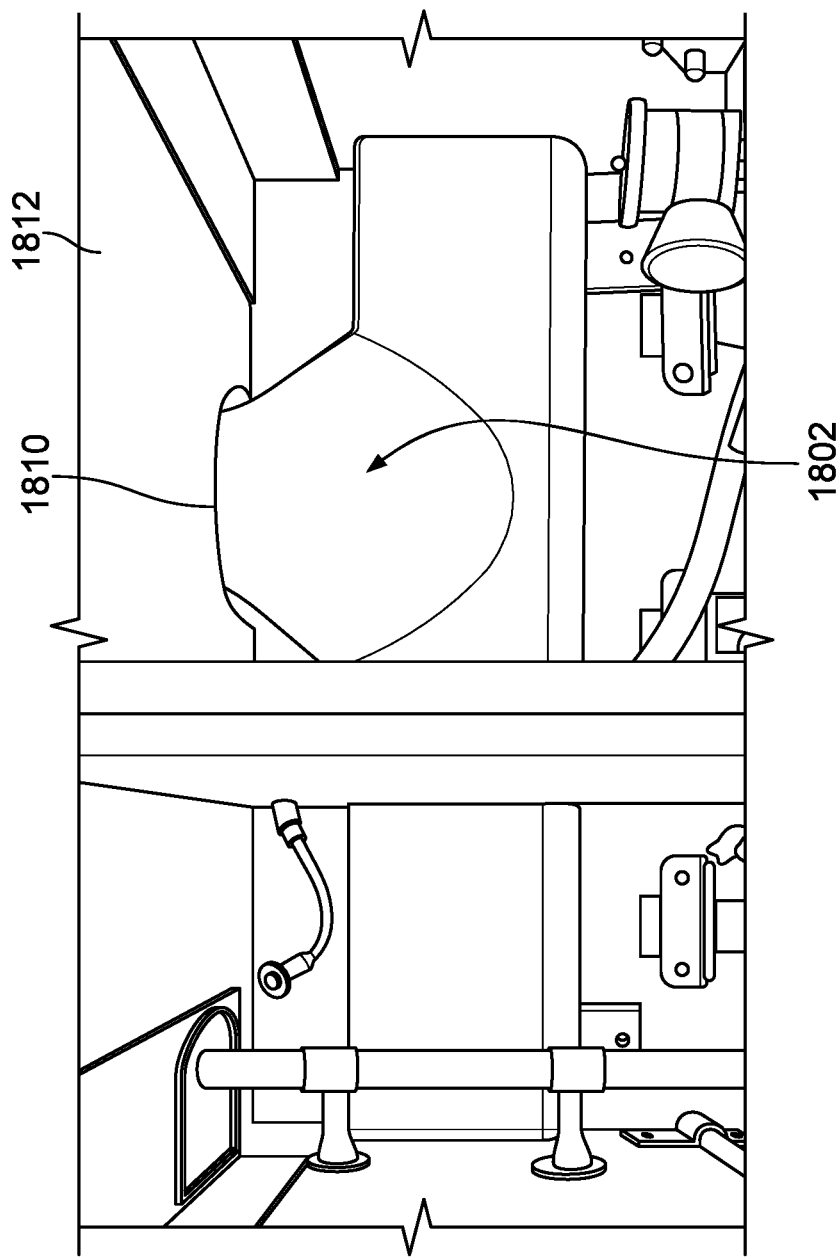
Figure 4C:
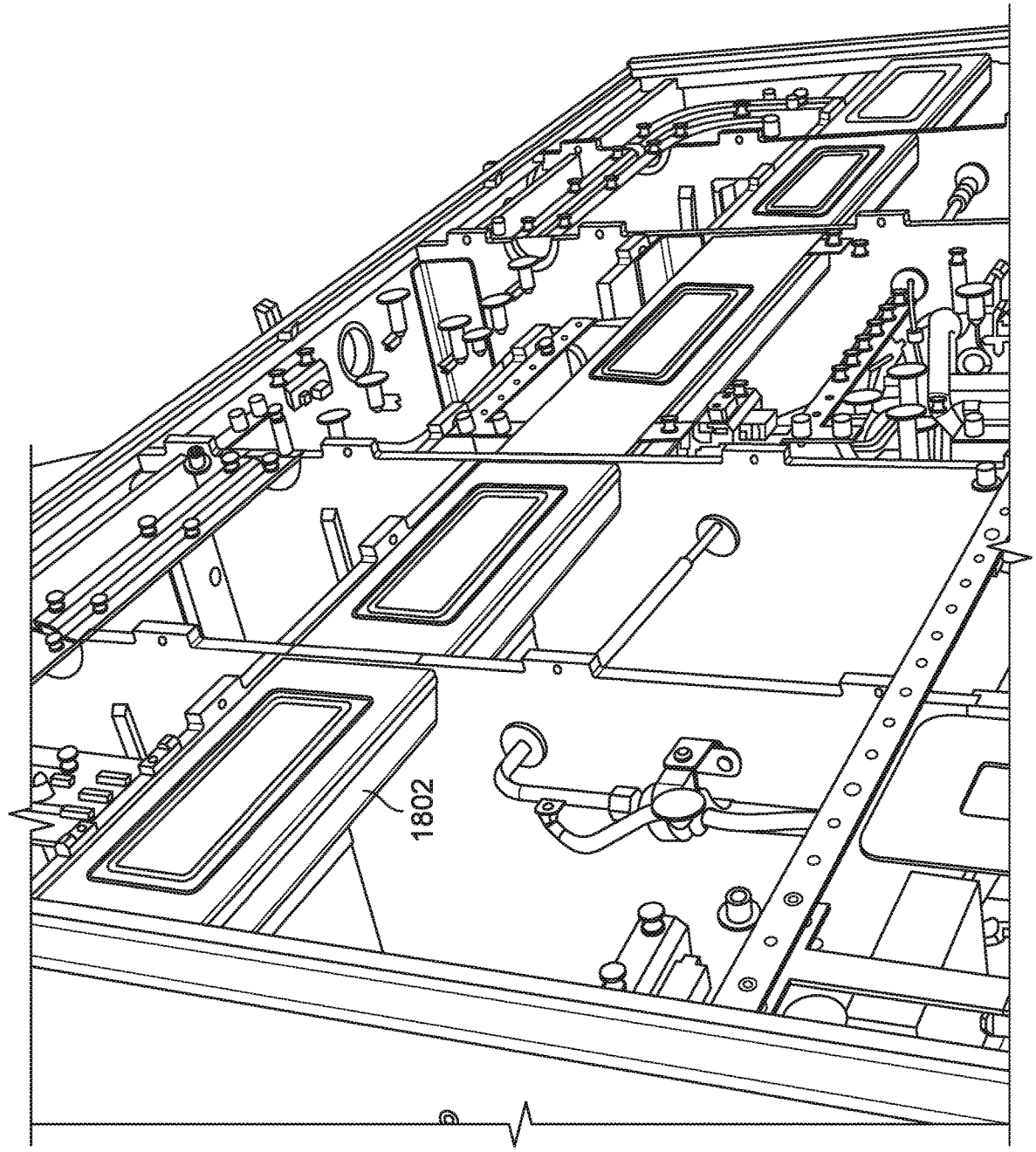

FIGS. 4A-4C illustrate various views of a galley extraction system 1800, according to an example embodiment. In some implementations, the galley extraction system 1800 may be included as part of a galley monument to remove hot air, steam, and smells away from ovens, coffee makers, and other galley appliances. The galley extraction system 1800 may include a duct section 1802, a first adapter 1804a and a second adapter 1804b, a first vertical panel 1806a and a second vertical panel 1806b, and a first foam seal 1808a and a second foam seal 1808b. In some examples, at least one of the duct sections 1802 and the adapters 1804a, 1804b may include fire retardant vacuum formed plastic or glass fiber composite.

Figure 15:
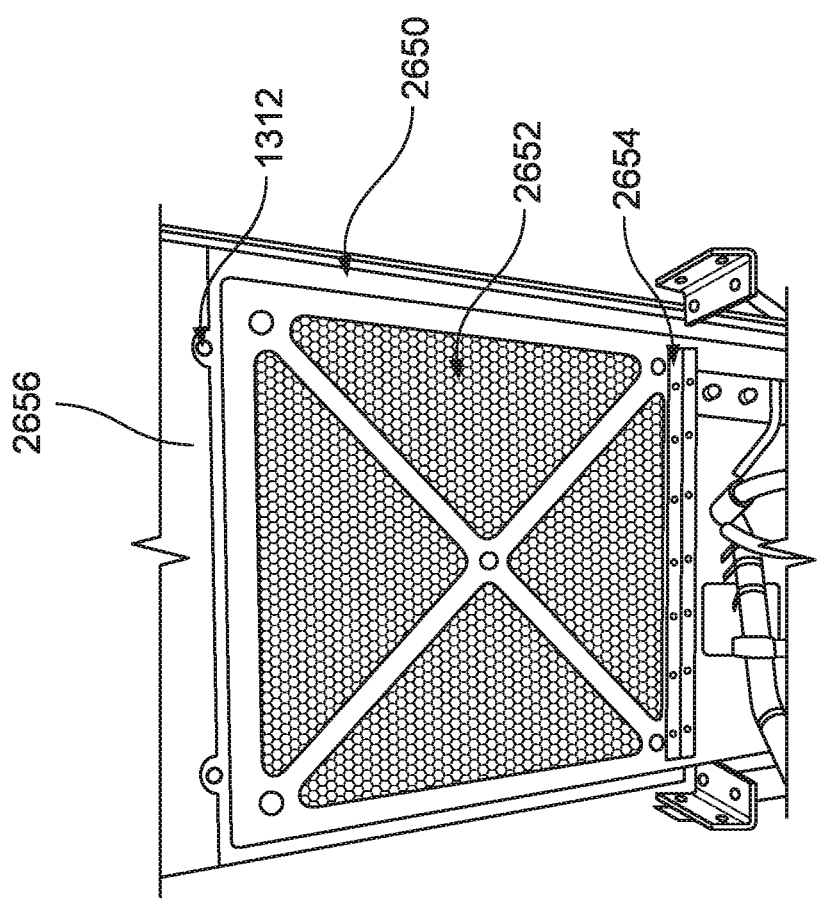
FIG. 15 illustrates a perspective view of a quick-change air filter grille.
Figure 16A:
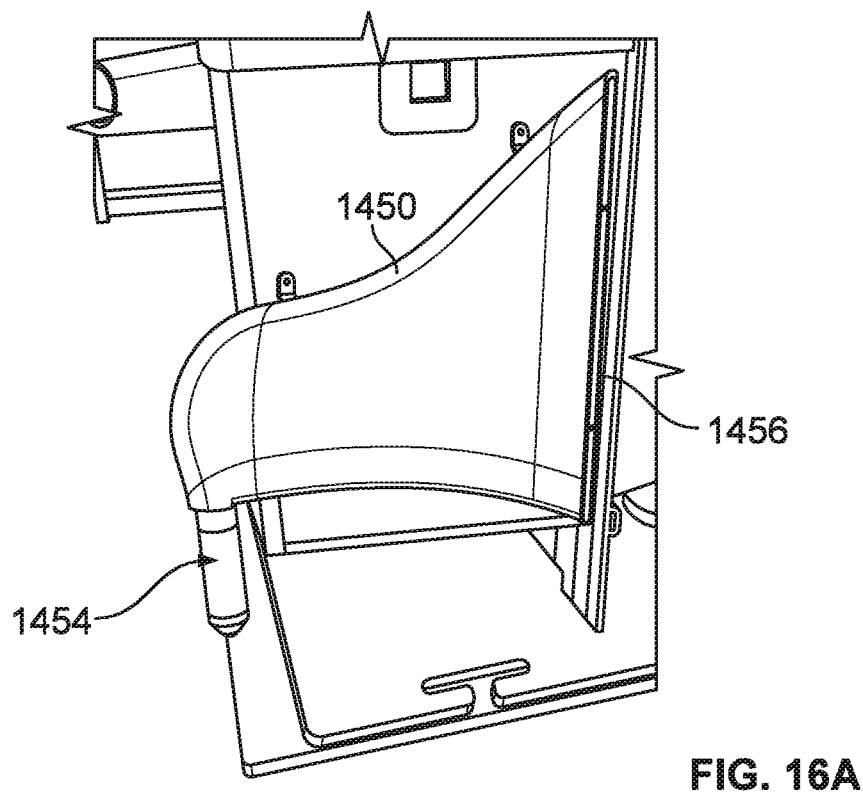
FIGS. 16A-16D represent perspective views of an expansion plenum for a low pressure, high volume air supply.
Figure 16B:
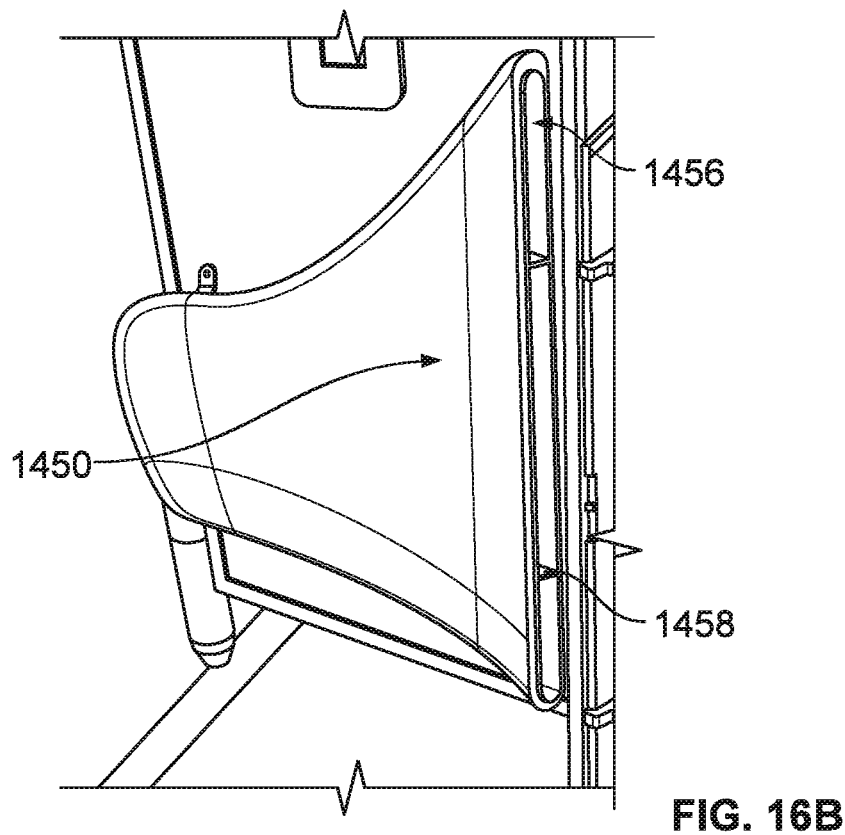
Figure 16D:
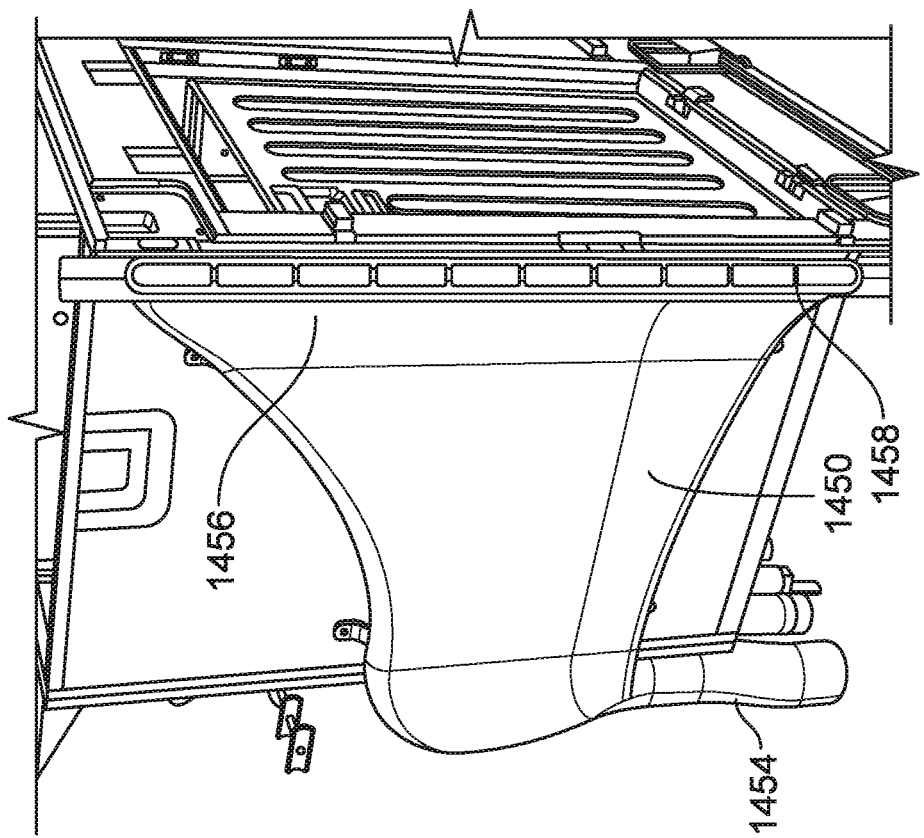
Figure 16C:
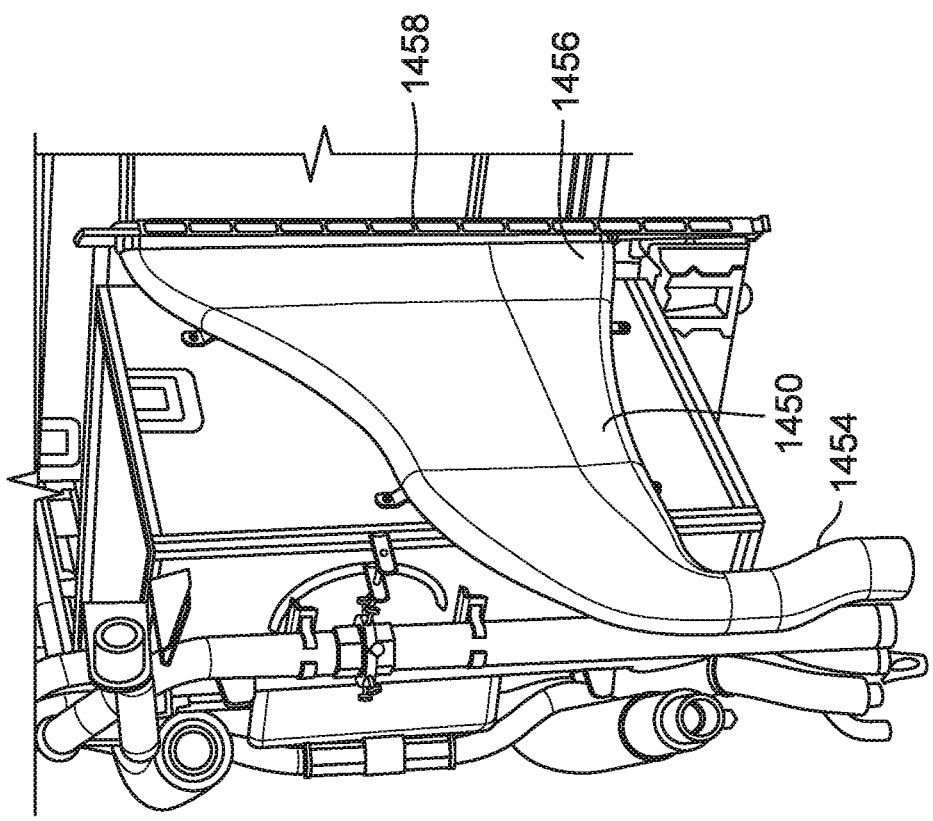

In some implementations, the duct section 1802 may be connected at a first end to a first side of the first adapter 1804a and at a second end to the first side of the second adapter 1804b, and the first adapter 1804a and the second adapter 1804b may be fitted to the first vertical panel 1806a and the second vertical panel 1806b, respectively. The vertical panel 1806a may be formed to accommodate the adapter 1804a, which may allow the duct section 1802 to be positioned toward a rear interior surface of a galley monument (labeled here as galley 1812) to channel air flow along a length of the galley monument. In some implementations, the duct section 1802 may have a cross section of at least one of any shape, for example, square, rectangular, elliptical, or circular, over a length of a series of duct sections 1802, with the adapters 1804a, 1804b and the vertical panels 1806a, 1806b shaped to correspond accordingly to a compartment in which the duct section 1802 is installed. In some examples, the modular duct sections may be connected to a variety of extraction devices such as plenum 1230 (FIG. 14) and air filter grille 2650 (FIG. 15).

In some examples, the second sides of the first adapter 1804a and the second adapter 1804b may each connect to additional duct section 1802 as needed. In this way, assemblies of the duct section 1802, the adapters 1804a, 1804b, the vertical panels 1806a, 1806b, and the foam seals 1808 described above may be repeated in a continuous series to provide various galley extraction systems 1800 with ducting of differing lengths. Further, at least one duct section 1802 may have a duct opening 1810 to allow air to flow into or out of the galley extraction system 1800.

Figure 5:
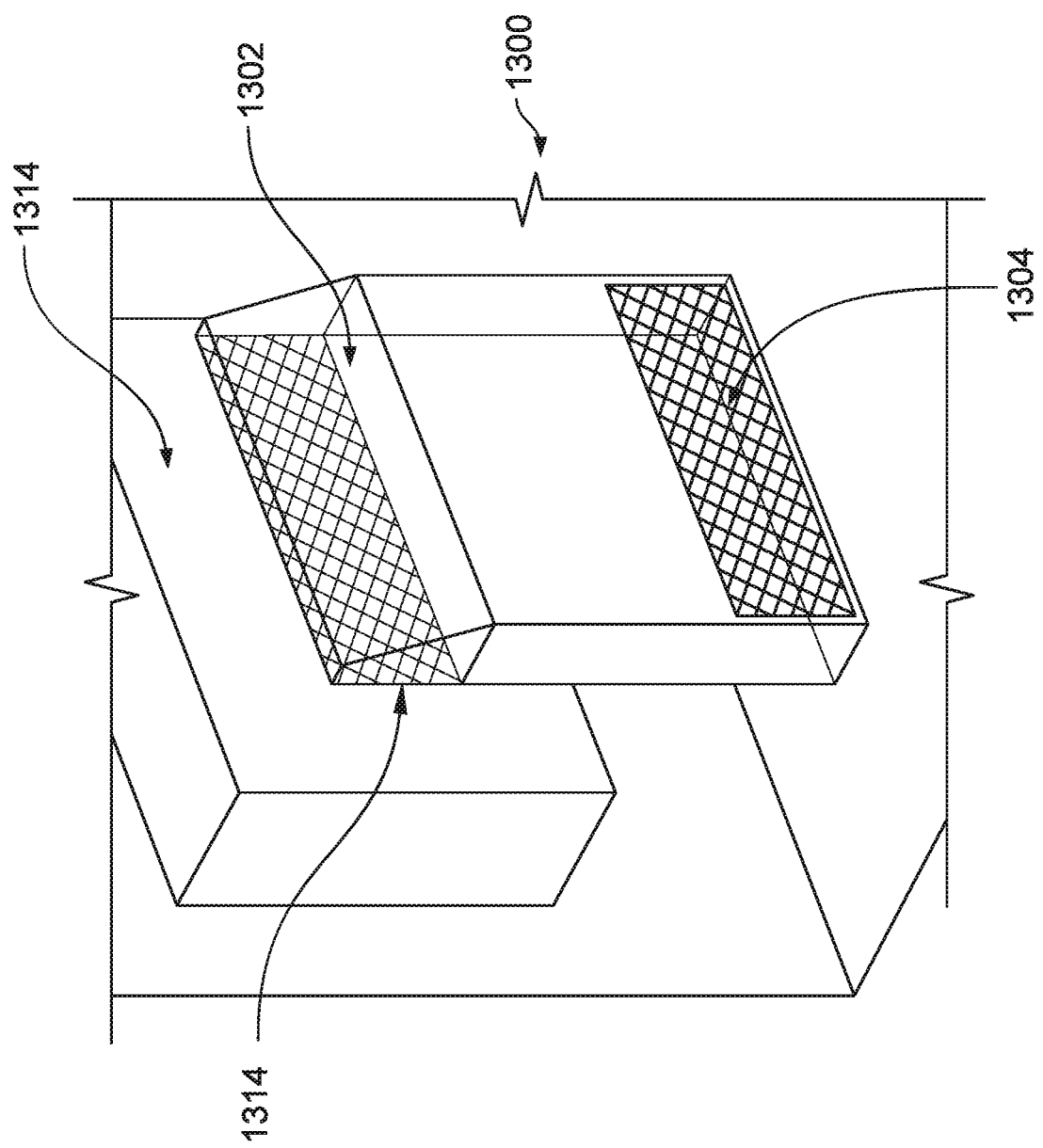
FIG. 5 illustrates a perspective view of an air duct extension.

FIG. 5 illustrates a perspective views of an air duct extension 1300, according to an example embodiment. In some implementations, the air duct extension 1300 may connect a galley monument to an air handling system. In some examples, the air duct extension 1300 may be designed to be removably connected to, and direct air flow toward an end of, a duct, plenum (see, e.g., plenum 1230 of FIG. 14), or other opening in an air circulation system, such as that in an aircraft galley. In some implementations, the air duct extension 1300 may lower an intake position of a chilled air return duct, which may allow chilled air to be drawn underneath the body of a trolley housed within a trolley bay. The air duct extension 1300 may include an inlet 1302 mounted to a galley duct 1314 and an outlet 1304. In some examples, air flow exiting the galley duct 1314 may enter the inlet 1302, be directed through the air duct extension 1300, and then exit the air duct extension 1300 through the outlet 1304 and into ductwork for an air handling system (not shown) connected to the outlet 1304.

Figure 6:
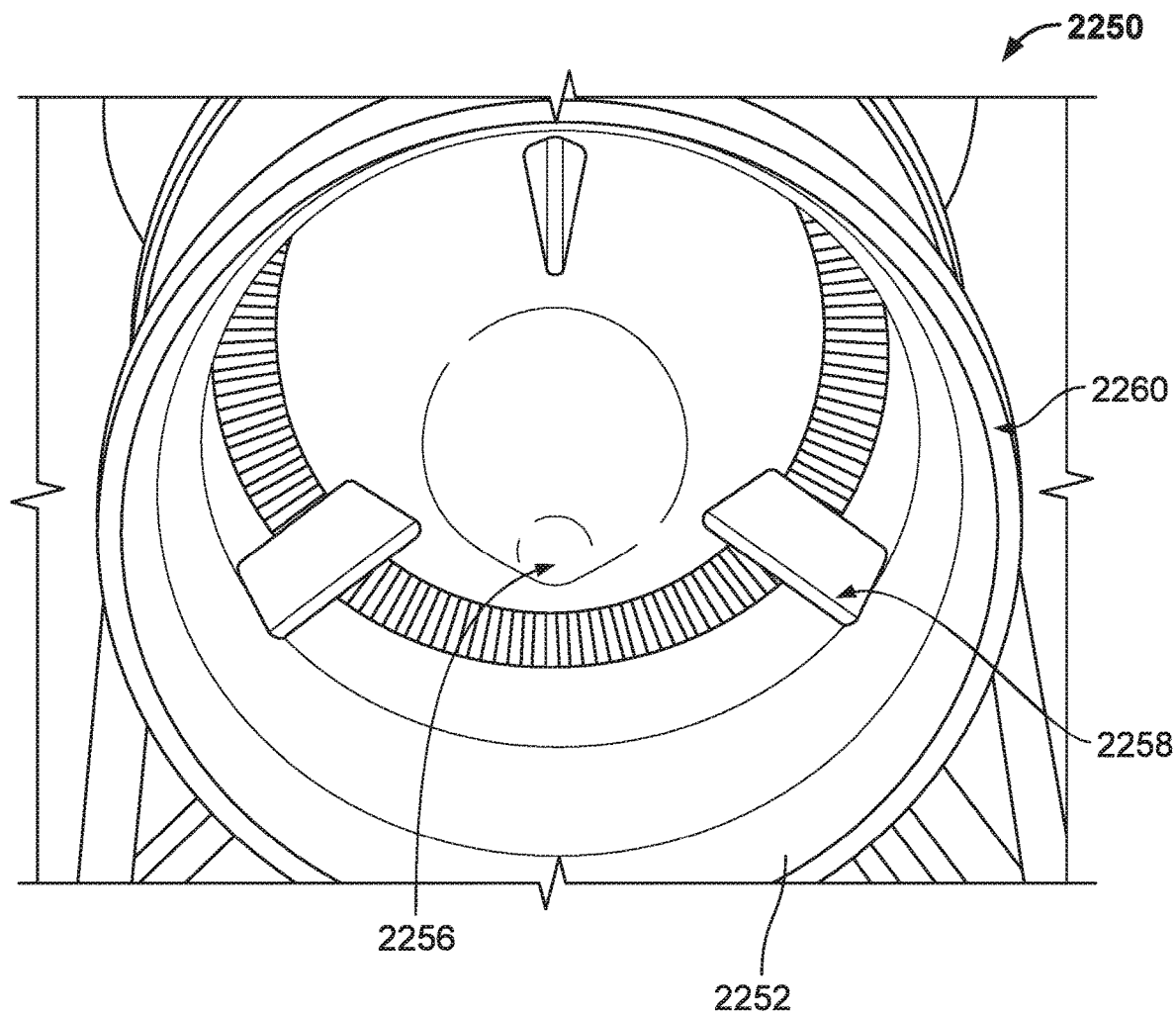
FIG. 6 illustrates a perspective view of an air flow device.

Turning to FIG. 6, a perspective view of an air flow device 2250 is illustrated. The illustration of FIG. 6 is from a perspective of an interior of a galley monument such that air flows "outward" from the perspective of FIG. 6 from the air flow device 2250 and into the galley monument. In some implementations, the air flow device 2250 may be designed to smooth air flow and increase throughput volume within an air duct 2260 that supplies air to the galley monument. The air flow device 2250 may include a pressure reducing cone 2256 positioned within the air duct 2260 between an air inlet and an air outlet (not shown) in which a coned or tapered end of the pressure reducing cone 2256 may be positioned to face the air inlet 2252 and may be supported by at least one support vane 2258 disposed around a periphery of the pressure reducing cone 2256. In one example, the pressure reducing cone 2256 may be deployed at the position of the sealing collar 1900, illustrated in FIGS. 3A-3C. In such an implementation, the pressure reducing cone 2256 may increase air flow by creating a low pressure zone, thus encouraging air flow to exit the air duct with less turbulence.

In one example, the pressure reducing cone 2256 may be supported by one support vane 2258. In another example, the pressure reducing cone 2256 may be supported by two support vanes 2258. In another example, the pressure reducing cone 2256 may be supported by three or more support vanes 2258.

Figure 7:
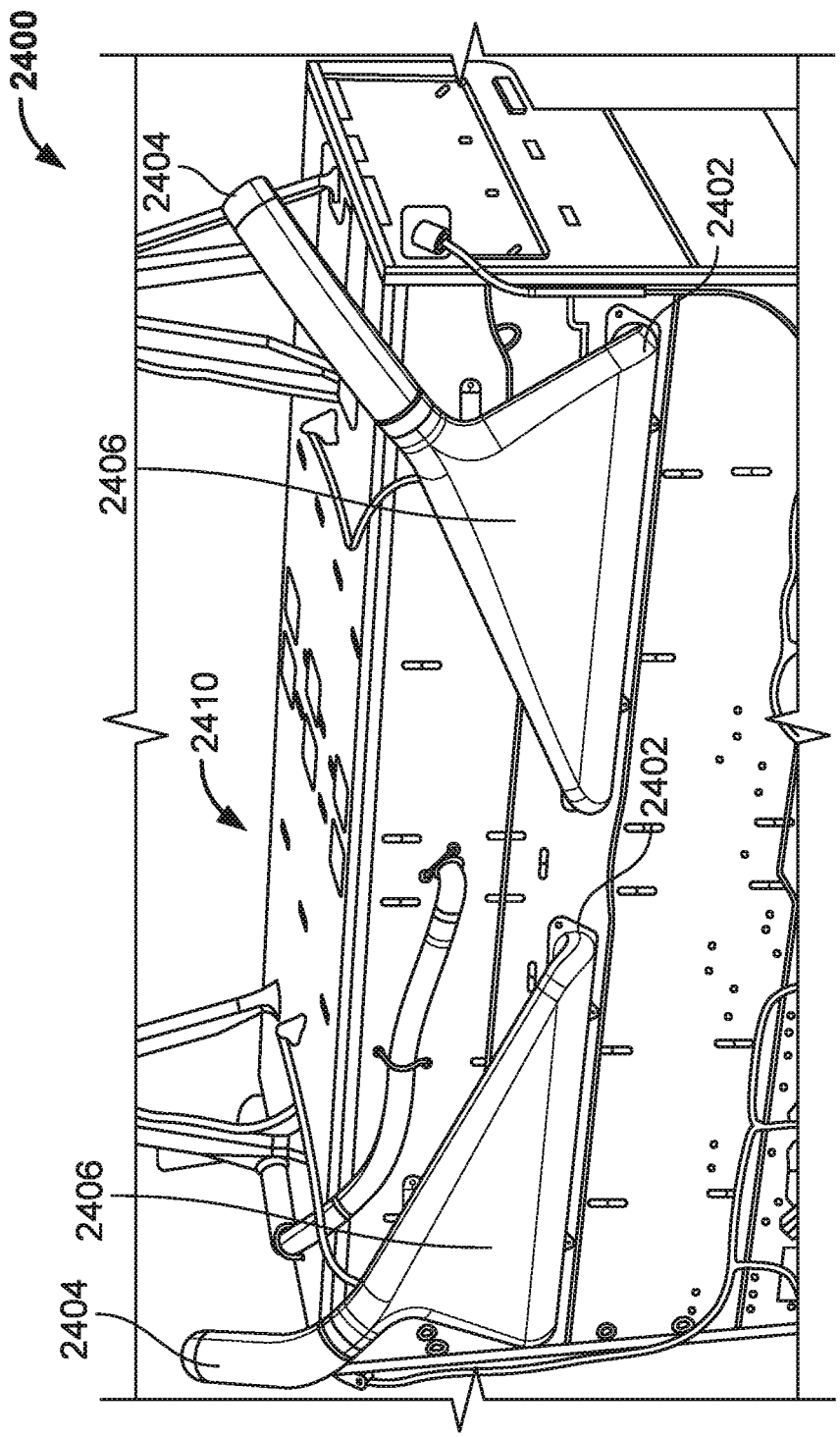
FIG. 7 illustrates an air extraction system.

FIG. 7 illustrates a cabin air extraction system 2400, according to an example embodiment. In some examples, the air extraction system 2400 may be configured to draw air from a specific location to which the components of the air extraction system 2400 are connected. For example, the air extraction system 2400 may withdraw air from an aircraft monument 2410, such as a galley monument, or from the aircraft cabin itself using the aircraft cabin ambient air. In some implementations, the air extraction system 2400 may include at least one air box 2406 mounted to a surface of the monument 2410 having an inlet 2402 that withdraws air that has circulated throughout the monument 2410 and an outlet 2404 that may discharge air from the air box 2406 to an external duct. In some examples, the inlet 2402 may be connected to an air extraction duct within the monument 2410, which may take in air that has circulated throughout one or more compartments of the monument 2410. In some aspects, the air box 2406 may have a tapered shape in which a width of the inlet 2402 may be greater than a width of the outlet 2404. In some aspects, the unique, tapered shape of the air box 2406 may enhance air flow received at the inlet and passing through the air box 2406 and may provide increase efficiency and air extraction capability of the air extraction system 2400 over non-aerodynamically optimized systems. In some examples, the air ducts may draw air through the plenums above the galley compartment or from the rear of a compartment as required, and the shape of the air box 2406 allows high air flows at low pressures to be achieved.

In some implementations, the air box 2406 may include a number of inlet ports connected to the galley (not shown) to withdraw circulated air from multiple galley compartment containers (not shown). In one example, the galley-facing surface of the air box 2406 may include multiple air inlets, extracting air from three separate modules of a galley monument. In some examples, the air box 2406 may function to balance the extraction flow and pressure across the number of inlets. An air box, for example, may be used in place of or in addition to an air restrictor. To determine design parameters of the air box 2406, in some implementations, an air flow analysis may be performed to determine air flow requirements for the multiple inlets.

In some implementations, restrictors may be used to modify air flow within ducts or plenums, such as for changing a sound or noise level, velocity, volume, or pressure of the air flow. In some examples, individual inlet restrictors may be employed to assist in balancing air extraction from the different galley compartments within a galley monument. Any of the implementations of restrictors described herein with respect to FIGS. 8A-8C and FIGS. 9A-9C may be used in any of the air ducts described in U.S. patent application Ser. No. 14/467,583, entitled "Universal Modular Ducting for Chilled Aircraft Galleys," filed Aug. 25, 2014, the entire contents of which is incorporated herein by reference.

Figure 8A:
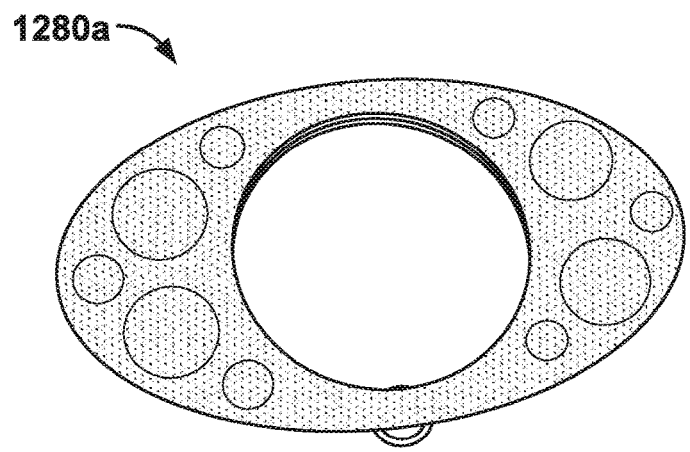
FIGS. 8A-8C illustrate front and rear views of restrictors for an air duct.
Figure 8B:
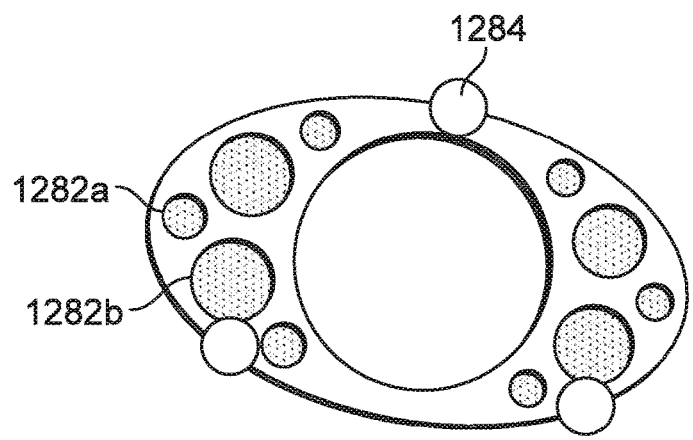
Figure 8C:
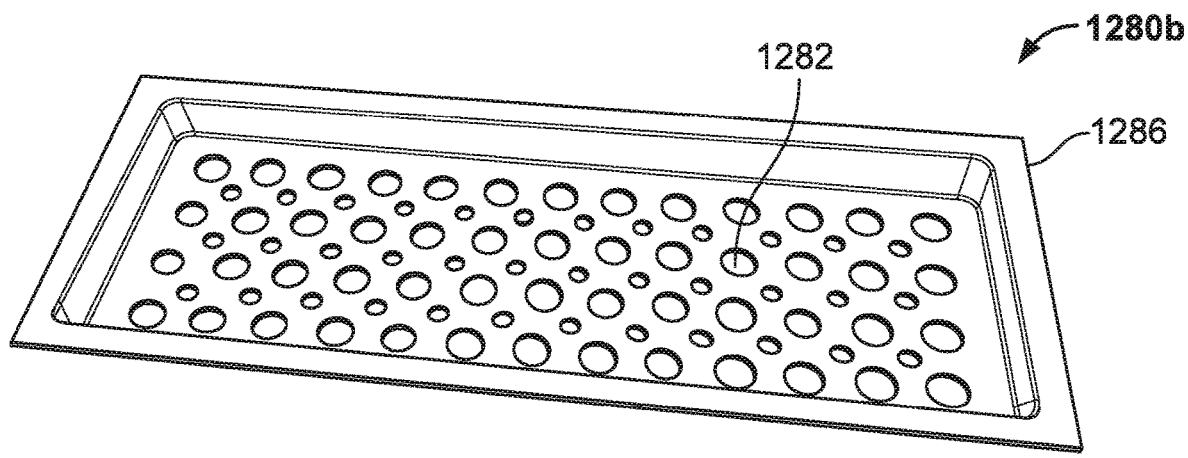

For example, FIGS. 8A-8C illustrate front and rear views of restrictors 1280 for an air flow system, according to example embodiments. In some implementations, restrictors may 1280 may be positioned within an air stream of the air flow system, for example, within an air duct that supplies air to or withdraws air from a galley monument. A first example restrictor 1280a, illustrated in FIGS. 8A-8B, may include a number of balance holes 1282 of various sizes disposed across a surface of the restrictor 1280. In addition, a shape of the restrictor 1280a may be based on a shape of an interior of the duct such that the restrictor 1280a may fit snugly within the duct when positioned substantially parallel to a direction of airflow through the duct. For example, the restrictor 1280a shown in FIGS. 8A-8B may have a substantially oval shape while the restrictor 1280b shown in FIG. 8C may have a substantially rectangular shape. In some implementations, restrictors may be formed with at least some of the balance holes 1282a,b removed or blanked off to fine tune a rate of air flow through the restrictor 1280 in terms of volume and pressure. In some examples, the restrictor 1280a may include one or more mounting tabs 1284 to connect with another surface, for example, a surface of an air distribution duct housing 1220 (as described in relation to FIGS. 2A-2E) or plenum 1230 (as described in relation to FIG. 14).

In some implementations, a sound frequency produced by air flow through the air duct may be adjusted by use of multiple balance holes 1282a, 1282b of different sizes (e.g., different diameters), resulting in a less intrusive level of noise that may provide additional comfort to a passenger within the aircraft. For example, smaller balance holes may tend to produce higher frequency sound, and larger balance holes may tend to produce lower frequency sound. In some aspects, overlapping sound frequencies by using multiple sizes of balance holes 1282 with the restrictor 1280 may reduce an overall sound level, thereby preventing a prominent audible tone at a single sound frequency. For example, a first set of balance holes 1282a may have a first diameter corresponding to a first predetermined frequency, and a second set of balance holes 1282b may have a second diameter that is larger than the first diameter that corresponds to a second predetermined frequency that is lower than the first predetermined frequency. In other examples, more than two different sizes of balance holes may be used.

In another example, shown in FIG. 8C, a restrictor 1280b may have a substantially rectangular shape with a number of balance holes 1282 of various sizes disposed on the surface of the restrictor 1280b that function similarly to that described above. In addition, mounting tabs may be formed from an edge or lip 1286 that surrounds a surface of the restrictor 1280b that is covered with balance holes 1282 to provide a surface to mount the restrictor 1280b to one or more surfaces of the air duct that is substantially parallel to the surface of the restrictor 1280b on which the balance holes 1282a, 1282b are disposed. In some examples, a height of the lip 1286 surrounding a periphery of the restrictor 1280b may be different than a height of the surface of the restrictor 1280b that is covered by the balance holes 1282. The difference in height between the surfaces may be based on dimensions and mounting locations within the duct so that the restrictor 1280b cooperatively mounts to one or more duct surfaces. In some examples, the recessed characteristics of the lip 1286 caused by the difference in height between the lip 1286 and the surface of the restrictor 1280b may allow a filter medium to be placed within the air intake.

Figure 9A:
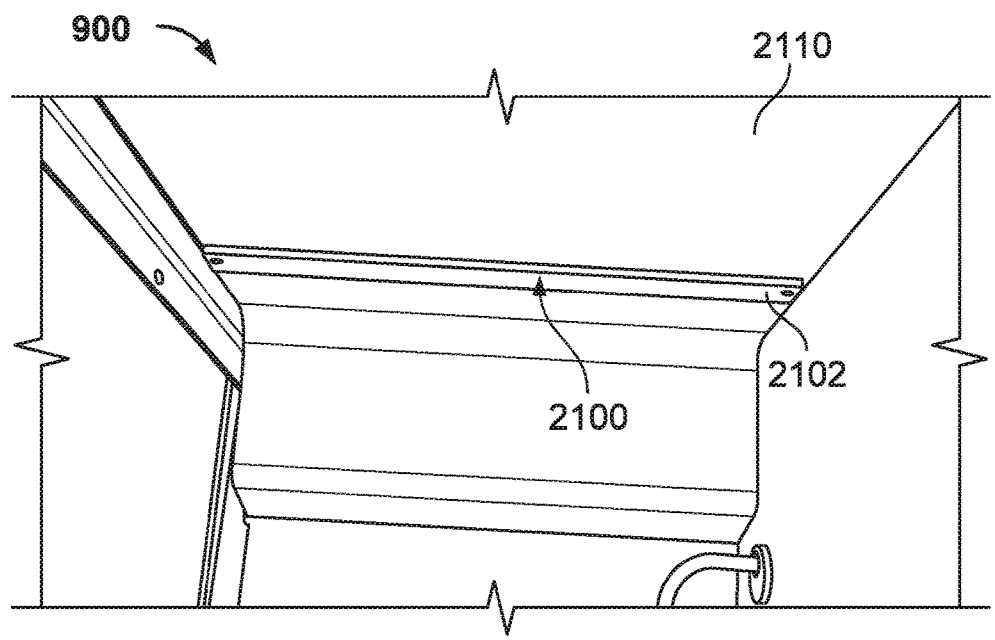
FIGS. 9A-9C illustrate various views of a restrictor for restricting air flow within an air duct.
Figure 9B:
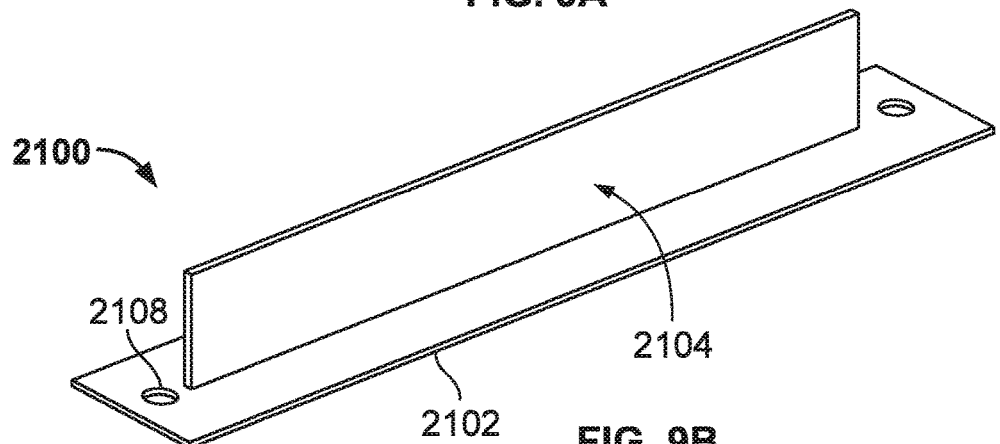
Figure 9C:
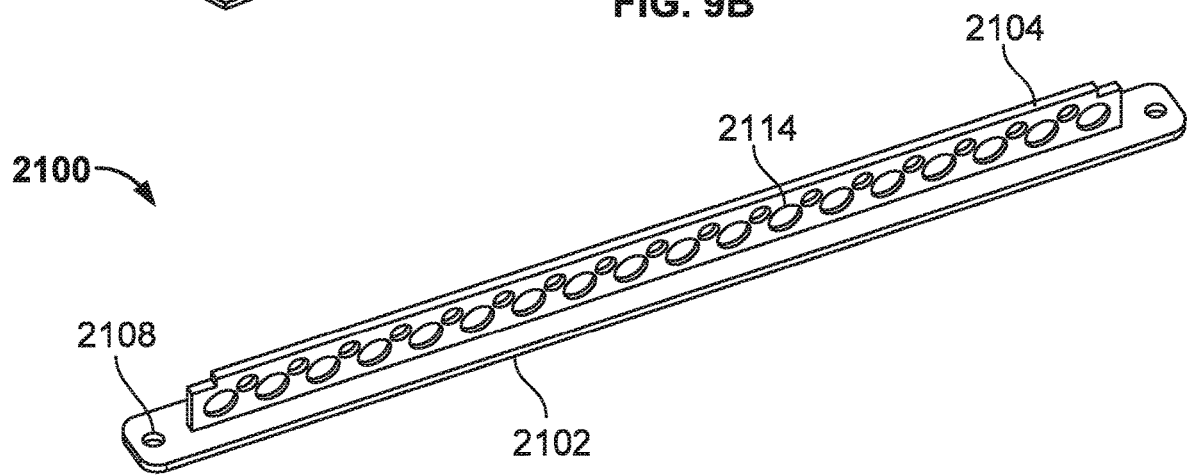

FIGS. 9A-9C illustrate various views of a restrictor 2100 for restricting air flow within an air duct, according to an example embodiment. For example, FIG. 9A illustrates an upward-looking perspective view within an interior of a galley compartment 900 that shows an air duct 2110 positioned at an upper end of the compartment with a restrictor 2100 inserted into the air duct 2110 through a slot lower surface in the air duct 2110. For example, FIG. 9A shows a lower surface of a mounting tab 2102 for the restrictor 2100 that is mounted to a lower surface of the air duct 2110.

As shown in FIG. 9B, in some implementations, the restrictor 2100 may include a restrictor blade 2104 mounted substantially perpendicularly to a mounting tab 2102. In some examples, the restrictor blade 2104 may be inserted into the air duct 2110 through a complementary slot or hole disposed in the lower surface of the air duct 2110. In some implementations, the slot in the lower surface of the air duct 2110 may have a width approximately the same as or wider than a width of the restrictor blade 2104 to provide for smooth insertion or withdrawal of the restrictor blade 2104 into the air duct 2110 while also ensuring that the restrictor blade 2104 fits snugly within the slot. All or a portion of the restrictor blade 2104 may be inserted into the slot, and the restrictor 2100 may be secured to an outer wall of the duct 2110 or other mounting location by at least one fastener connected to a hole 2108 disposed on the mounting tab 2102. The position within the air duct 2110 as well as cross sectional area, shape, and hole pattern of the restrictor blade 2104 may alter air flow within the duct 2110. In some implementations, a position of the restrictor blade 2104 within the duct 2110 may be adjusted by varying a number of washers connected to each fastener to change an effective height of the restrictor blade 2104 inside the duct 2110. In one example, the restrictor blade 2104 may be a solid rectangular plate. In another example, the restrictor blade 2104 may include a number of section holes 2114, as shown in FIG. 9C, that may be of various sizes, allowing tuning of characteristics of air flow in the duct 2110, for example, velocity, pressure, direction, and sound frequency.

Further, steps for a method of varying air flow and pressure restriction within a duct may include changing a number of washers or a plates positioned between a fastener and a hole 2108 of a mounting tab 2102 to adjust an effective height of a restrictor blade 2104 positioned within a duct 2110, or exchanging a first restrictor 2100 connected to a duct 2110 for a second restrictor 2100 having a restrictor blade with a different effective cross sectional area.

In some implementations, air flow may be directed to locations that have adjustable outlets, allowing a user to adjust a volume of air flow reaching those locations. Adjustment may allow fine tuning of the volume of air flowing to each of those locations, as well as the proportion of air flow distributed to a number of locations in cases where more than one location is serviced by one source of air flow. In some implementations, an amount of air flow may be directed to more than one location by proportioning the amount of air flow between two locations or directions, such that total air flow exiting an air flow adjustment device remains constant while the amount of air flow directed toward each location may be adjusted.

For example, FIGS. 10A-10C illustrate various views of portions of a gasper assembly 2000 for a galley monument, that may be used to distribute and direct air flow from a common source to a number of locations throughout the galley monument or within the greater aircraft cabin. In some implementations, the gasper assembly 2000 may include a splitter 2006, a first and a second gasper plenum 2008 (2008a, 2008b), and a respective first and a second gasper 2010 for each of the gasper plenums 2008a,b (one gasper 2010 is illustrated in FIG. 10C). In some examples, the gasper 2010 may provide a portion of the air flow entering the splitter 2006 to a location and in a direction that the gasper 2010 is oriented within the galley monument or aircraft cabin.

In some implementations, the splitter 2006 may include a gasper air inlet 2002, and a first and a second gasper outlet 2004 (2004a, 2004b). In other examples, the splitter 2006 may include more than two outlets to direct air flow to more than two gaspers 2010. The gasper plenum 2008a may be coupled at a first end to the first gasper outlet 2004a, and at a second end to a gasper 2010. Similarly, the gasper plenum 2008b may be coupled at a first end to the second gasper outlet 2004b, and at a second end to the gasper 2010b. Air flows from an external air source system into the splitter 2006 by way of the gasper air inlet 2002. A portion of the air flow exiting the splitter 2006 may exit through the first gasper outlet 2004a, and a remainder of the air flow may exit the splitter 2006 through the second gasper outlet 2004b.

In some implementations, each gasper 2010 may supply air to a space such as a compartment of a galley monument or an aircraft cabin, and air flow parameters of the air exiting the gasper 2010 into the space may be adjustable. In some examples, an external surface of the gasper 2010 may include, for example, a bezel 2012 that may allow a user to easily rotate the gasper 2010 to adjust a rate of exit air flow. For example, rotation of the gasper 2010 may cause adjustment of a position of an internal valve disposed within an interior of the gasper 2010. The internal valve may, for example, be a disk valve or poppet valve that may be configured to control the amount of air entering the space through the gasper 2010. In some examples, the gasper 2010 may also include a rotating mount 2013 that may allow a direction of air flow exiting the gasper 2010 to be adjusted by a user.

Figure 11A:
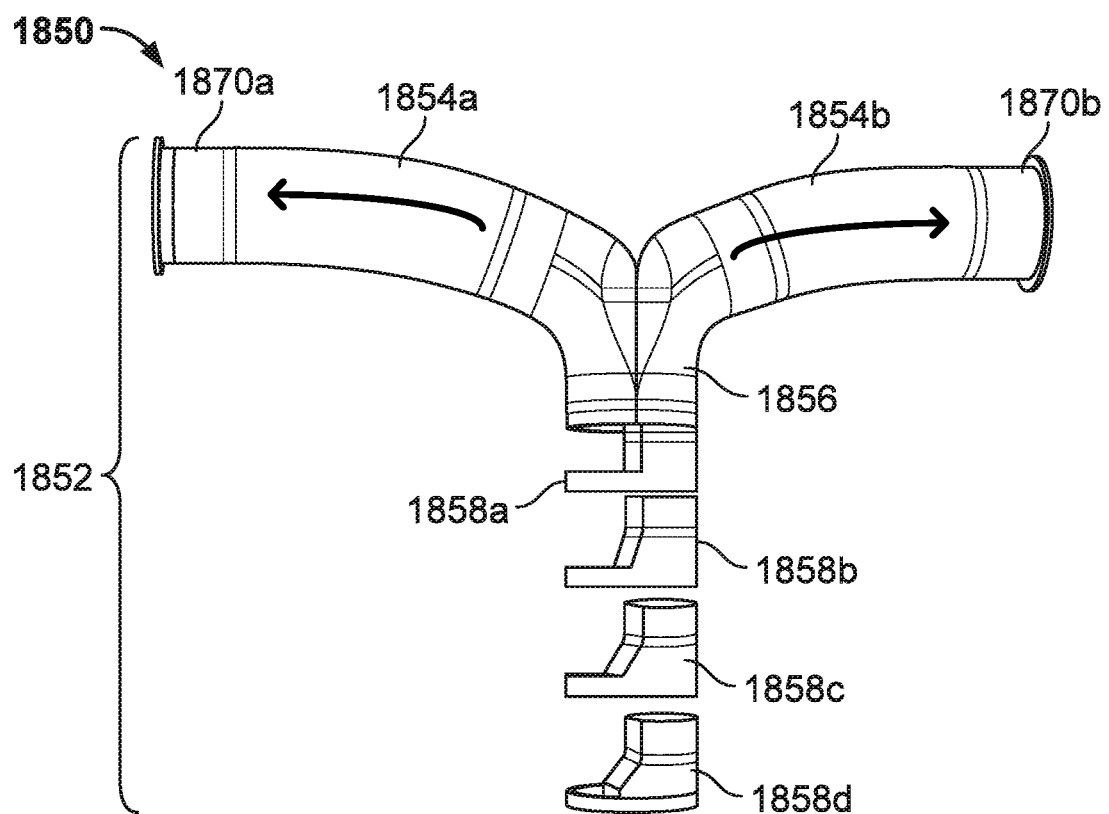
FIGS. 11A-11B illustrate various views of an air deflection system for altering air flow within an air duct.
Figure 11B:
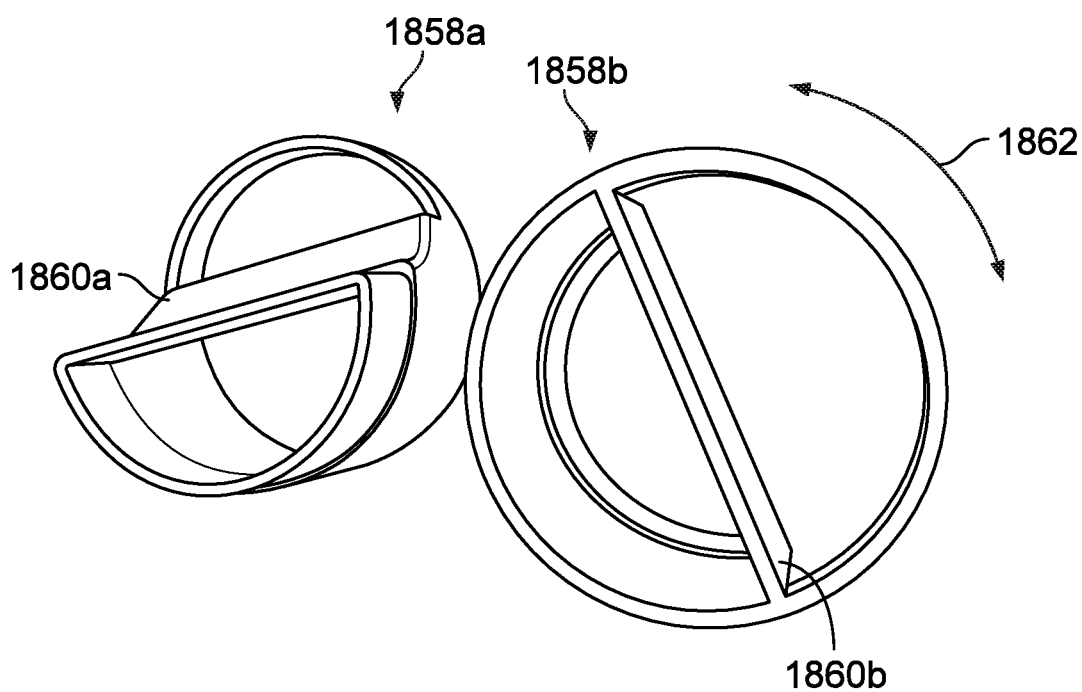

FIGS. 11A-11B illustrate various views of an air deflection system 1850 for modifying air flow within an air duct. In some implementations, the air deflection system 1850 may include an inlet tube assembly 1852 that may include a first duct 1854a and a second duct 1854b that share a common inlet 1856 for receiving air flow into each of the ducts 1854a,b. In addition, each of the ducts 1854a,b includes a respective outlet 1870a,b that outputs proportioned air flow to one or more spaces within the galley monument, such as to compartments within the galley monument. In some examples, the inlet tube assembly 1852 may also include more than two ducts 1854 connected to the common inlet 1856 that receive proportioned air flow from an air handling system.

In some implementations, at least one splitter 1858 may be positioned inside the inlet 1856 upstream of the ducts 1854a,b such that air flow that enters the inlet tube assembly 1852 from an aircraft air handling system flows through the splitter 1858 before flowing into the ducts 1854a,b. In some implementations, the splitter 1858 may further include a vane 1860 (e.g. 1860a, 1860b) to divide air flow entering the splitter 1858 between the duct 1854a and the duct 1854b. In some implementations, a total amount of air flow entering a first (inlet) end of the splitter 1858 may be equal to total air flow exiting a second (outlet) end of the splitter 1858. However, a first portion of exiting air flow from the splitter 1858 may be directed toward the first duct 1854a and a second portion of exiting air flow from the splitter 1858 is directed toward the second duct 1854b. In some examples, rotation of the splitter 1858 about a central axis perpendicular to its diameter may cause an adjustment in a ratio of the first portion of air flow to the second portion of air flow, thereby altering the proportion of exiting air flow to the first duct 1854a and the second duct 1854b in addition to altering an amount of turbulence and noise produced within the ducts 1854a, 1854b. In some implementations, fixed amounts of rotation of the splitter 1858 may produce proportionally known changes in air flow rates between the duct 1854a and the duct 1854b. In addition, the splitter 1858 may include at least one graduation 1862 about a circumference, for example, markings or notches to more easily allow repeatable and/or discrete adjustment. Due to varying proportions of exit air flow from the vane 1860 of the splitter 1858, pressure or velocity of air flow entering the first duct 1854a and the second duct 1854b may differ.

A variety of vane 1860 designs for the splitter 1858 are possible, such as those shown in FIG. 11B. In one example, the vane 1860b may be a flat plane with a central longitudinal axis positioned to pass through the center of an inner diameter of the splitter 1858. In another example, the vane 1860 may be a flat plane with a central longitudinal axis offset from the center of the inner diameter of the splitter 1858. In another example, the vane 1860a may be a curved plane and have at least one edge offset from the center of the inner diameter of the splitter 1858. In another example, the vane 1860 may be a curved plane and have at least one edge pass through the center of the inner diameter of the splitter 1858. In selecting a particular type of vane 1860 for the splitter 1858, design characteristics of the galley monument (e.g., orientation, positioning, layout of compartments and modules), and/or the balance and distribution of airflow through the galley monument may be considered.

As shown in FIG. 11A, in some embodiments, multiple splitters may be connected in series, such as first, second, third, and fourth splitters 1858a-d and to allow additional precision and flexibility in adjustment of air flow proportioning between the duct 1854a and the duct 1854b. For example, each of the splitters 1858a-d have a predetermined amount of relative rotational offset from the other connected splitters 1858a-d to achieve predetermined air flow characteristics to each of the ducts 1854a,b.

Steps for a method of installing air deflectors with vanes positioned in a repeatable position and having a predetermined amount of rotational adjustment may include inserting the splitter 1858 into an inlet 1856, and rotating the splitter 1858 in discrete amounts to change a proportion of air flow to a duct 1854a and a duct 1854b by a repeatable amount. In some implementations, the method may further include adding the second splitter 1858b in series with the first splitter 1858a, adjusting airflow by rotation of at least one of the splitter 1858a and the splitter 1858b. Additional series-connected splitters may subsequently be attached to an adjacent splitter 1858 in a similar fashion.

Figure 12:
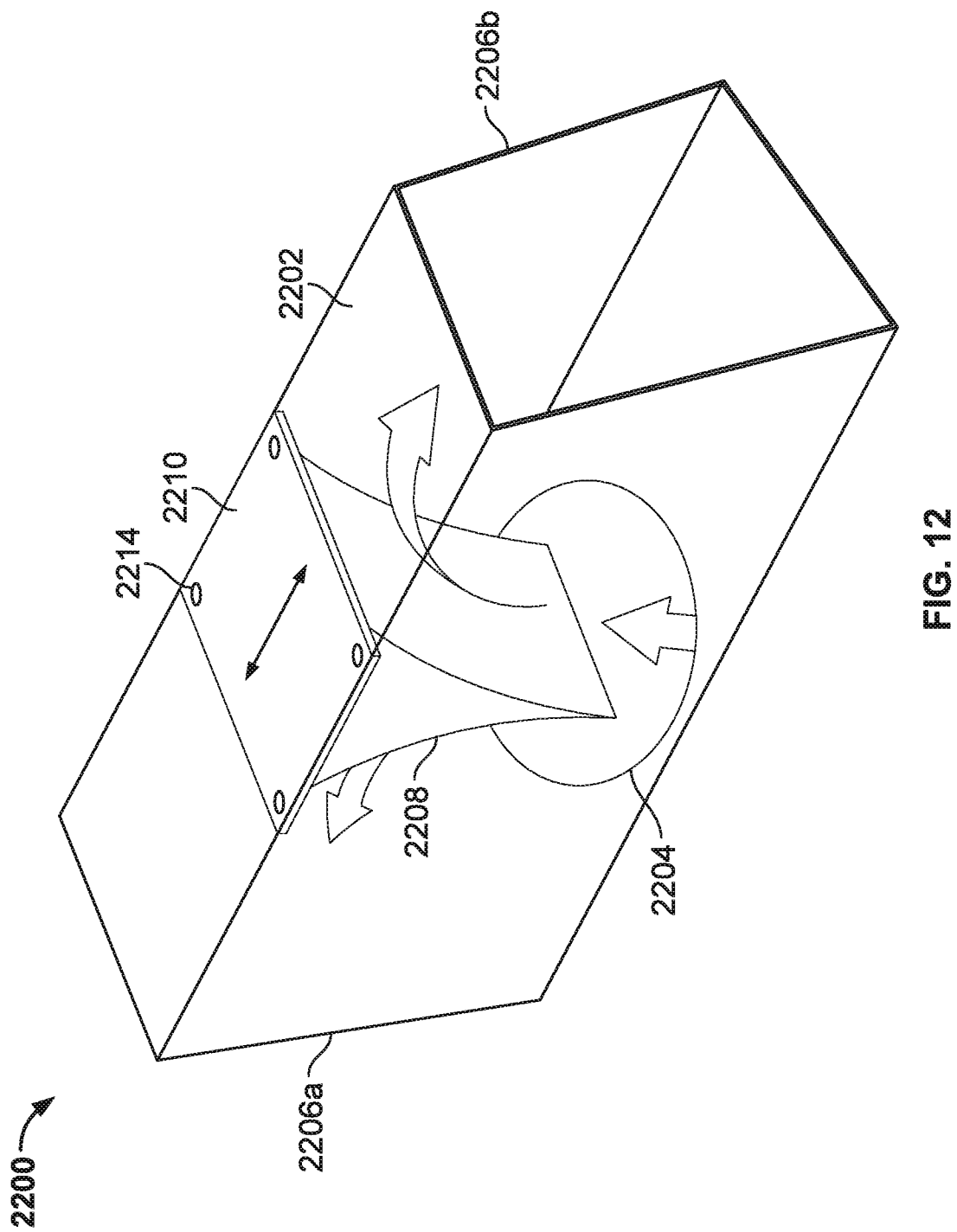
FIG. 12 illustrates an airflow adjuster for positioning within an air duct of a galley monument.

FIG. 12 illustrates an airflow adjuster 2200 that may be positioned within an air duct of a galley monument, according to an example embodiment. In some implementations, the airflow adjuster 2200 may include a base 2210 located on or within a duct 2202. The base 2210 may include a splitter 2208 that may be configured to divert air flow received through a supply inlet 2204 of the duct 2202 toward supply outlets 2206a,b. In some examples, the duct 2202 may include at least one connection point 2214 to which the base 2210 may be mounted and/or slideably connected. The at least one connection point 2214 may be, for example, a groove or a slotted hole. In some examples, the duct 2202 may further include a supply inlet 2204 and two supply outlets 2206 (2206a, 2206b). In some implementations, the splitter 2208 may be positioned adjacent to the supply inlet 2204 of the duct 2202 such that substantially all of the air flow is diverted toward the supply outlets 2206a,b without inadvertently passing between sides of the splitter 2208 upon entering the duct 2202. Movement or translation of the base 2210 of the splitter 2208 along the connection points 2214 may cause a change in the position of the splitter 2208 with respect to the supply inlet 2204, thus changing a proportion of airflow directed to each supply outlet 2206a and 2206b of the duct 2202.

In some implementations, measurement of air flow characteristics, such as velocity, pressure, or temperature, within a duct or plenum may be desired. A sensor placed within the air flow may provide measurements or detect certain conditions about the air flow. For example, FIG. 13 illustrates a pressure measurement system 1778 for monitoring air flow within an air duct of a galley monument system, according to an example embodiment. In some implementations, the pressure measurement system 1778 may be deployed for use within an air duct. In some implementations, the pressure measurement system 1778 may include a pitot tube 1780 having an opening exposed to an air stream at a first end, a number of pressure ports 1784 (e.g. 1784a, 1784b, 1784c) positioned along a length of the pitot tube 1780, and a micromanometer (not shown) connected at a second end. The pitot tube 1780 may be disposed within an interior of air duct 1782 such that the micromanometer is able to measure pressure within the air duct 1782. In one example, the micromanometer electronically calculates air flow based on static pressure within the pitot tube 1780, which may be output to a control panel for an aircraft air handling system, which may be located within a cockpit or at a flight crew station.

FIG. 14 illustrates a downward looking perspective view of an interior of a galley compartment including a plenum 1230 mounted at a rear end of an interior of the galley compartment, which may include connections to an air handling system. In some implementations, the plenum 1230 may be used for removal of extracted air, which may include excess heat, odors, and/or visible steam produced by galley insert equipment such as ovens, beverage makers, and microwaves. In some examples, the plenum 1230 may pull, withdraw, or collect the air to be extracted from within the galley compartment and route the extracted air toward a second side of the monument where the plenum 1230 connects to an extraction system, such as the galley extraction system 1800 illustrated in FIGS. 4A-4C.

The plenum 1230 may include a cartridge housing 1232 connected to a plenum outlet, the cartridge housing 1232 holds an air filter cartridge 1236 in place and may be secured by a connector 1234 (1234a, 1234b) on a first edge and connected by a mounting tab 1235 positioned on a second edge. The cartridge housing 1232 may further incorporate an anti-cockroach mesh to trap or filter any undesired objects from the extracted air. In some examples, the air filter cartridge 1236 may filter air flow exiting the plenum 1230 directed toward an aircraft cabin, and may change color as filtration capacity is diminished to indicate a need for replacement. In one example, the connectors 1234a, 1234b may be of a quick release type to allow convenient access to the air filter cartridge 1236, and may be removable without the use of additional tools. In one example, the connectors 1234a, 1234b may be spring loaded and may be engaged or released by a quarter of a turn. In some implementations, an air restrictor 2100 (as illustrated in FIG. 9A-9C) may be positioned within the plenum 1230 in order to modify the air flow characteristics of the extracted air flowing through the plenum 1230.

In some implementations, any of the components of the plenum 1230 or connected to the plenum outlet, the cartridge housing 1232, the connectors 1234a, 1234b, the mounting tab 1235, and the air filter cartridge may be formed partially or entirely from fire approved Phenolic glass, carbon reinforced Epoxy or Phenolic composite laminate, vacuum formed plastic or lightweight metallic components. The internal airflow and pressure of the plenum 1230 may be changed or varied without removal from the galley monument by the use of an easily accessible restrictor 2100, as illustrated by FIGS. 9A-9C.

In some implementations, filters may be fitted to plenums, air ducts, or vents to filter an air flow. Periodically, filters may need to be serviced, changed, or replaced. An aircraft may contain a number of filters located throughout aircraft ventilation systems, which may include the air condition systems and air handling systems that interface with air ducts supplying conditioned or unconditioned air to a galley monument. Therefore, access to filters, as well as the ability to easily service, inspect, and/or replace them, may be important for efficient servicing. For example, FIG. 15 illustrates a quick-change air filter grille 2650, according to an example embodiment. In some implementations, the air filter grille 2650 may be connected to a plenum 2656 on a first edge by a hinge 2654 and on a second edge by a quick release mechanism 1312. An air filter 2652 may be secured by the air filter grille 2650 over the plenum 2656 such that air passing through the air filter grille 2650 into the plenum 2656 is filtered by the filter 2652 such that impurities in the air may be trapped within the filter 2652. In some examples, the air filter grille 2650 may be designed to allow ease of access to the air filter 2652 by way of the quick release mechanism 1312 and by rotating about the hinge 2654 only a small amount, for example in the range of 10 to 15 degrees from the plenum 2656, before the air filter 2652 may be installed or removed.

FIGS. 16A-16D illustrate perspective views of an expansion plenum 1450 of an air duct for a galley monument. In some implementations, the expansion plenum 1450 may include an inlet 1454 and an outlet 1456. The inlet 1454 may be connected at a first end to an air source 1452, which may include a heated air source with a heater, that supplies air to the expansion plenum 1450 through the inlet 1454, and the inlet 1454 may be connected at a second end to a first end of the expansion plenum 1450. The outlet 1456, through which air exits the expansion plenum 1450 and enters at least one compartment of the galley monument, may be positioned at a second end of the expansion plenum 1450. Although the expansion plenum 1450 may be designed to accommodate air from a heated air source, the expansion plenum 1450 may also connect to other non-heated and/or unconditioned air source systems.

In some implementations, the expansion plenum 1450 may be shaped to distribute a relatively large, high pressure volume of incoming air from the second end of the inlet 1454, diffuse the air flow to reduce pressure at the outlet 1456 of the expansion plenum 1450, release low pressure air through a confined space, for example inside a galley monument, and/or distribute the airflow into, for example, an aircraft cabin. The expansion plenum 1450 may additionally function to reduce noise of high pressure air volume.

At least one internal divider 1458 may be positioned inside the expansion plenum 1450 to aid in directing air flow between the second end of the inlet 1454 and the outlet 1456 of the expansion plenum 1450. The outlet 1456 may be relatively narrow and tall (having a relatively high ratio of height to width) to fit into certain spaces, for example, a corner where two monument galleys meet. The ratio of a cross sectional area of the outlet 1456 to the inlet 1454 may also be relatively high to reduce pressure and velocity of air flow passing through the expansion plenum 1450. In one example, the ratio of the cross-sectional outlet 1456 is designed to enable a flow of about 40 litres per second (l/s) for each outlet, at a maximum of 0.5 meters per second (m/s) velocity.

In some implementations, monuments may contain compartments for storage of equipment and supplies during flight. Some compartments may contain removable storage devices such as trolleys and standard unit containers. Equipment and supplies contained within monument storage compartments may be secured while an aircraft is in use to prevent unintended release. Further, temperatures within a compartment may also be maintained at different levels relative to an ambient temperature of a main cabin of the aircraft such as through the use of air handling systems described above and/or sealing systems such as doors and door seals, designed to isolate an interior of a compartment from a surrounding environment. Further, additional systems may be added to indicate to users (such as flight crew) a state of use of a compartment, such as preventing latching of a compartment door if a turn button securing a removable storage device inside the compartment is positioned a particular way to ensure securement of the removable storage device.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A ducting assembly for providing airflow to at least one compartment of an aircraft galley monument, the ducting assembly comprising:
   a supply air duct configured to provide a supply airflow path from an external air system to a first compartment of the at least one compartment, the supply air duct including an inlet port mounted to a surface of the compartment to provide an inlet path for air flowing from the supply air duct to the compartment;
   a return air duct configured to provide an exit airflow path to the external air system for return air that has circulated throughout the compartment, the return air duct including an outlet port mounted to a surface of the rear compartment to provide an outlet path for the return air from the compartment to the return air duct; and
   an airflow adjustment apparatus including an airflow adjustment surface disposed within at least one of the supply airflow path of the supply air duct and the exit airflow path of the return air duct, the airflow adjustment surface configured to cause a modification of airflow properties for air flowing across or through the airflow adjustment surface,
   wherein the airflow adjustment apparatus includes a mounting surface disposed around a periphery of the air flow adjustment surface and substantially parallel to the airflow adjustment surface, wherein the mounting surface is configured to provide one or more locations for mounting the airflow adjustment apparatus to at least one air duct wall,
   wherein a shape of the airflow adjustment apparatus corresponds to a shape of an interior of the supply air duct or the return air duct such the airflow adjustment apparatus fits snugly within an interior of the supply air duct or the return air duct,
   wherein the airflow adjustment apparatus includes a mounting surface positioned substantially perpendicular to the airflow adjustment surface,
   wherein the airflow adjustment surface includes a plurality of apertures arranged in predetermined patterns across a length and width of the airflow adjustment surface such that the air flowing through supply air duct or the return air duct flows through the plurality of apertures,
   wherein the plurality of apertures includes a first set of apertures having a first diameter and a second set of apertures having a second diameter that is larger than the first diameter,
   wherein the air flowing through the first set of apertures is configured to produce a first audible tone at a first frequency, and the air flowing through the second set of apertures is configured to produce a second audible tone at a second frequency such that a mutual frequency cancellation between the first audible tone and the second audible tone is configured to prevent a prominent audible tone at a single frequency.

2. The ducting assembly of claim 1, wherein the airflow properties include at least one of pressure, velocity, direction, and sound frequency.

3. The ducting assembly of claim 1, wherein the airflow adjustment surface is positioned substantially perpendicular to a direction of airflow through the supply air duct or the return air duct.

4. The ducting assembly of claim 1, wherein a wall of the supply air duct or the return air duct includes a slot disposed within the wall, wherein the airflow adjustment apparatus is configured to be inserted through the wall into an interior of the supply air duct or the return air duct.

5. The ducting assembly of claim 4, wherein a width of the slot within the wall of the supply air duct or the return air duct corresponds to a greatest width of the airflow adjustment apparatus.

6. The ducting assembly of claim 4, wherein the mounting surface is configured to be mounted to an outer surface of the wall at one or more mounting locations when the airflow adjustment apparatus is inserted into the slot.

7. A compartment disposed within an aircraft galley monument, the aircraft galley compartment comprising:
   an enclosure configured to house an equipment item, the enclosure comprising a rear surface, an upper wall, and opposing side walls, wherein at least one of the rear surface, upper wall, or opposing side walls includes one or more air duct connections; and
   a ducting assembly comprising
      a supply air duct configured to provide a supply airflow path from an external air system to the enclosure, the supply air duct including an inlet port mounted to a surface of the enclosure to provide an inlet path for air flowing from the supply air duct to the enclosure,
      a return air duct configured to provide an exit airflow path to the external air system for return air that has circulated throughout the enclosure, the return air duct including an outlet port mounted to a surface of the enclosure to provide an outlet path for the return air from the enclosure to the return air duct, and
      an airflow adjustment apparatus including an airflow adjustment surface disposed within at least one of the supply airflow path of the supply air duct and the exit airflow path of the return air duct, the airflow adjustment surface configured to cause a modification of airflow properties for air passing across or through the airflow adjustment surface,
      wherein the airflow adjustment apparatus includes a mounting surface disposed around a periphery of the air flow adjustment surface and substantially parallel to the airflow adjustment surface, wherein the mounting surface is configured to provide one or more locations for mounting the airflow adjustment apparatus to at least one air duct wall,
      wherein a shape of the airflow adjustment apparatus corresponds to a shape of an interior of the supply air duct or the return air duct such the airflow adjustment apparatus fits snugly within an interior of the supply air duct or the return air duct,
      wherein the airflow adjustment apparatus includes a mounting surface positioned substantially perpendicular to the airflow adjustment surface,
      wherein the airflow adjustment surface includes a plurality of apertures arranged in predetermined patterns across a length and width of the airflow adjustment surface such that the air flowing through the supply air duct or the return air duct flows through the plurality of apertures, wherein the plurality of apertures includes a first set of apertures having a first diameter and a second set of apertures having a second diameter that is larger than the first diameter, wherein the air flowing through the first set of apertures is configured to produce a first audible tone at a first frequency, and the air flowing through the second set of apertures is configured to produce a second audible tone at a second frequency such that a mutual frequency cancellation between the first audible tone and the second audible tone is configured to prevent a prominent audible tone at a single frequency.

8. The compartment of claim 7, wherein a wall of the supply air duct or the return air duct includes a slot disposed across a width of the wall, wherein the airflow adjustment apparatus is configured to be inserted through the wall into an interior of the supply air duct or the return air duct.

9. The compartment of claim 8, wherein a width of the slot within the wall of the supply air duct or the return air duct corresponds to a greatest width of the airflow adjustment apparatus.

10. The compartment of claim 8, wherein the mounting surface is configured to be mounted to an outer surface of the wall at one or more mounting locations when the airflow adjustment apparatus is inserted into the slot.

* * * * *